(12) United States Patent
Tanijiri

(10) Patent No.: US 8,310,764 B2
(45) Date of Patent: Nov. 13, 2012

(54) IMAGE DISPLAY DEVICE AND HEAD MOUNT DISPLAY

(75) Inventor: Yasushi Tanijiri, Osakasayama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 35 days.

(21) Appl. No.: 13/122,023

(22) PCT Filed: Sep. 30, 2009

(86) PCT No.: PCT/JP2009/067037
§ 371 (c)(1), (2), (4) Date: Mar. 31, 2011

(87) PCT Pub. No.: WO2010/041578
PCT Pub. Date: Apr. 15, 2010

(65) Prior Publication Data
US 2011/0181960 A1   Jul. 28, 2011

(30) Foreign Application Priority Data
Oct. 6, 2008   (JP) ................................ 2008-259329

(51) Int. Cl.
*G02B 27/14* (2006.01)
(52) U.S. Cl. ........................................ 359/630; 359/636
(58) Field of Classification Search ............. 359/13, 359/630, 631, 634, 636; 345/7–9
See application file for complete search history.

(56) References Cited

U.S. PATENT DOCUMENTS

| 7,502,153 | B2 * | 3/2009 | Shimizu | 359/13 |
| 7,898,502 | B2 * | 3/2011 | Tanijiri et al. | 345/7 |

FOREIGN PATENT DOCUMENTS

| JP | 11-326821 A | 11/1999 |
| JP | 2004-271651 A | 9/2004 |
| JP | 2007-079298 A | 3/2007 |
| WO | WO 2010/041578 A1 | 4/2010 |

* cited by examiner

*Primary Examiner* — Alicia M Harrington
(74) *Attorney, Agent, or Firm* — Cozen O'Connor

(57) ABSTRACT

Provided are an image display device and HMD, which can make an observer observe an image with reduced luminance nonuniformity and reduced color nonuniformity, while making the image bright by reducing the degree of diffusion with a constitution employing a means which diffuses incident light in one direction. In the image display device, light from a light source is diffused in one direction with the diffusing means and is guided to a display element, and image light emitted from the display element is guided to an optical pupil through a lens. The image display device with the constitution satisfies the expression $Hw/f \leq \tan 1' Kw/(f+\delta)$, wherein $Hw$ is the aperture width of pixels of the display element in the diffusing direction of the diffusing means, $Kw$ is the maximum pitch of recesses and protrusions in the diffusing direction of the diffusing means, $f$ is the focal length of the lens, and $\delta$ is the distance between the display surface of the display element and the diffusing surface of the diffusing means.

21 Claims, 14 Drawing Sheets

IMAGE DISPLAY DEVICE AND HEAD MOUNT DISPLAY

RELATED APPLICATIONS

This application is a U.S. National Stage Application under 35 U.S.C. 371 of International Application No. PCT/JP2009/067037, filed with Japanese Patent Office on Sep. 30, 2009, which claims priority to Japanese Patent Application No. 2008-259329, filed Oct. 6, 2008.

TECHNICAL FIELD

The present invention relates to an image display device for providing an observer with an image displayed on a display element as a virtual image, and a head mount display (also referred to as "HMD" hereinafter) equipped with the aforementioned image display device.

BACKGROUND ART

An image display device having been invented so far to provide an observer with an image displayed on an LCD or similar display element as a virtual image is exemplified by the invention disclosed in the Patent Literature 1. In the image display device of Patent Literature 1, the light emitted from an LED array is diffused by a diffusing plate and is led into the LCD. The image light from the LCD is then led to an optical pupil through optical elements such as a prism or lens. When the pupil of the observer is set to the position of the optical pupil, the observer is allowed to see the image displayed on the LCD.

Incidentally, to facilitate observation of an image (virtual image) by the observer, it is essential to brighten the image while expanding the optical pupil. In this case, if the incident light is diffused in all directions by a diffusing plate, the brightness of the light will be reduced, even if the optical pupil can be expanded in all directions. Thus, it is very effective to use a diffusing plate that diffuses incident light in one direction (unidirectional diffusing plate), instead of a diffusing plate that diffuses the incident light in all directions. To be more specific, the unidirectional diffusing plate is used to diffuse the incident light in one direction and to form a big optical pupil in one direction, whereby easier observation of the image by an observer is ensured. Further, the light from the light source is converged in the direction perpendicular to the aforementioned direction of diffusion so that the observer is provided with a brighter image.

CITATION LIST

Patent Literature

Patent Literature 1: Unexamined Japanese Patent Application Publication No. Hei 11 (1999)-326821

SUMMARY OF INVENTION

Technical Problem

FIG. 17a is a cross sectional view representing an example of the configuration of a unidirectional diffusing plate 101. The light-emitting surface 101a as the diffusing surface of the unidirectional diffusing plate 101 is formed of recesses and protrusions. In this structure, when light has entered the unidirectional diffusing plate 101 from a light incoming surface 101b, light is not emitted because of total reflection from the portion of the light-emitting surface 101a having a steeper inclination of the recesses and protrusions, for example, with the result that the shade P corresponding to the aforementioned portion wherein light is not emitted will appear in the light emitted from the unidirectional diffusing plate 101.

Thus, if the unidirectional diffusing plate 101 is applied to a conventional image display device, the shade P of the unidirectional diffusing plate 101 will be superimposed on the observed image (virtual image) Q, as shown in FIG. 17b, and luminance nonuniformity and color nonuniformity will appear to deteriorate the quality of the observed image Q. This phenomenon is likely to occur when the aperture width of each pixel of the display element is greater than the width corresponding to the resolution (e.g., one minute in terms of viewing angle) of the human eye, and when the unidirectional diffusing plate 101 is located close to the display element. To be more specific, FIG. 18 is an enlarged view of the display region of the display element (e.g., LCD). If there is an excessive aperture width Hw of each pixel A in the diffusing direction, the shade P superimposed on the pixel A can be identified, with the result that the quality of the observed image will be deteriorated. To avoid this problem, if the unidirectional diffusing plate 101 is located far away from the display element, the light utilization efficiency will be reduced and the observed image Q will be darkened. This is not recommended.

If the diffusion of the unidirectional diffusing plate 101 is excessive, the image will be darkened. The degree of diffusion is preferably reduced to ensure a bright image to be observed. However, reduction in the degree of diffusion signifies an increase in the size of the pitch of the recesses and protrusions in the diffusing direction. This is more likely to cause luminance nonuniformity and color nonuniformity to be produced by the shade of the unidirectional diffusing plate 101.

As disclosed in the Patent Literature 1, if the surface light source such as an LED away is used as a light source for illuminating the display element, a greater amount of diffusion will be required to reduce the luminance nonuniformity of the surface light source, and the image will be darkened. This is not recommended.

The present invention is intended to solve the aforementioned problems. It is accordingly an object of this invention to provide an image display device including a means for diffusing the incident light unidirectionally, wherein the observer is supplied with a high-quality image with reduced luminance nonuniformity and color nonuniformity, whereas the degree of diffusion of the diffusing means is reduced to provide a bright image. The present invention also intends to provide a head mount display equipped with the aforementioned image display device.

Solution to Problem

An image display device of the present invention is an image display device comprising: a point light source; a diffusing means comprising a diffusing surface in which recesses and protrusions are formed in one direction with a plurality of pitches, for diffusing light traveling from the light source by the diffusing surface in the one direction and emitting the diffused light; a display element comprising a plurality of pixels and a light-shielding section formed around the plurality of pixels, for displaying an image by modulating light traveling from the diffusing means with the plurality of pixels; and an ocular optical system for guiding light of an image traveling from the display element to an optical pupil, to make an observer observe a virtual image of the image at the optical pupil. The image display device is characterized by satisfying the following conditional expression (1), where Hw is an aperture width of the pixels of the display element in a diffusing direction of the diffusing means, Kw is a maximum pitch of the recesses and protrusions in the diffusing direction of the diffusing means, f is a focal length of the ocular optical system, and 3 is a distance from a display surface of the display element to the diffusing surface of the diffusing means.

$$Hw/f \leq \tan 1' \leq Kw/(f+\delta) \quad (1)$$

In the image display device of the present invention, it is preferable that an aperture ratio Hw/Hp of the pixels of the display element in the diffusing direction of the diffusing means satisfies the following conditional expression (1A), where Hp is a pitch of the pixels of the display element in the diffusing direction of the diffusing means.

$$0.3 \leq Hw/Hp \leq 0.8 \quad (1A)$$

In the image display device of the present invention, it is preferable that the diffusing means comprises a diffusing surface in which recesses and protrusions are formed in one direction with a plurality of pitches ranging from 1 μm to 20 μm.

In the image display device of the present invention, the light source may comprise light-emitting diodes emitting light of three colors of red, green, and blue, respectively, and the light-emitting diodes may be arrayed in the diffusing direction of the diffusing means.

In the image display device of the present invention, the light source may comprise two sets of light-emitting diodes for emitting red, green, and blue light, respectively, and the light-emitting diodes of each color may be arranged symmetrically with respect to an optical axis of the ocular optical system, where the optical axis is an axis optically connecting a center of a display region of the display element and a center of the optical pupil.

In the image display device of the present invention, it is preferable that the distance δ from the display surface of the display element to the diffusing surface of the diffusing means is set such that a difference in visibility between a virtual image formed by the ocular optical system of the diffusing means and a virtual image of an image displayed on the display element is 10 diopters or less.

In the image display device of the present invention, the diffusing means may be arranged such that the diffusing direction intersects with a long-side direction of a rectangular display region of the display element.

In the image display device of the present invention, it is preferable that a diffusion degree of the diffusing means in the diffusing direction is ten or more times larger than a diffusion degree of the diffusing means in a direction perpendicular to the diffusing direction.

In the image display device of the present invention, it is preferable that an opposing surface to the diffusing surface in the diffusing means is a non-diffusing surface, and that the diffusing means is arranged such that the diffusing surface faces the display element.

In the image display device of the present invention, it may be further comprise a light-converging means for converging light traveling from the light source, in a direction perpendicular to the diffusing direction of the diffusing means and for guiding the light to the diffusing means, wherein the light source and the optical pupil may be arranged at conjugate positions along a direction perpendicular to the diffusing direction of the diffusing means.

In the image display device of the present invention, it is preferable that the light-converging means has no-optical-power or negative-optical-power in a direction parallel with the diffusing direction of the diffusing means.

In the image display device of the present invention, it is preferable to satisfy the following conditional expression (2), where Vw is an aperture width of the pixels of the display element in a direction perpendicular to the diffusing direction of the diffusing means.

$$\tan 1' \leq Vw/f \quad (2)$$

In the image display device of the present invention, it may further comprise an optical-path bending member for bending an optical path from the light source to the display element, wherein the diffusing means may be arranged in an optical path between the optical-path bending member and the display element.

In the image display device of the present invention, the optical-path difference bending member may comprise a refracting surface and a reflecting surface. After the refracting surface refracts light traveling from the light source and the reflecting surface reflects the light, the refracting surface may refract the light again to guide the light to the diffusing means.

In the image display device of the present invention, the ocular optical system may comprise a hologram optical element of a volume phase type and a reflection type, and the hologram optical element may diffract and reflect light of an image traveling from the display element to guide the light to the optical pupil.

In the image display device of the present invention, it is preferable that the hologram optical element has axi-asymmetric positive optical power.

In the image display device of the present invention, it is preferable that the diffusing direction of the diffusing means is almost parallel with a direction perpendicular to an optical-axis incident surface of the hologram optical element, where the optical axis is an axis optically connecting a center of a display region of the display element to a center of the optical pupil.

In the image display device of the present invention, it is preferable that the light source comprises a light-emitting diode, and a wavelength at which a diffraction efficiency of the hologram optical element is maximum and a wavelength at which an intensity of light emitted from the light source are almost same.

In the image display device of the present invention, the ocular optical system may comprise a first transparent substrate for totally reflecting light of an image from the display element on a inside thereof; to guide the light to the optical pupil, and for transmitting outside light to guide the outside light to the optical pupil.

In the image display device of the present invention, the ocular optical system may further comprise a second transparent substrate for canceling refraction of the outside light caused in the first transparent substrate.

A head-mounting display of the present invention is a head-mounting display characterized by comprising: the above-described image display device; and a supporting means for supporting the image display device at a front of an eye of an observer.

Advantageous Effects of Invention

When the conditional expression (1) is met, the pitches of the recesses and protrusions on the diffusing surface of the diffusing means can be enlarged to reduce the degree of diffusion, whereby the observer is supplied with a bright image. Further, the aperture width of the pixels of the display element in the diffusing direction can be reduced, and the greater part of the shade of the recesses and protrusions on the diffusing surface can be superimposed on the light-shielding section of the display element. Moreover, for the shade superimposed on the pixels of the display element, the aperture width of the pixels is smaller than that corresponding to the resolution (corresponding to one minute in terms of viewing angle) of the human eye. This makes it more difficult for the observer to identify the shade through the pixels. To be more specific, when the conditional expression (1) is satisfied, the observer is supplied with a high-quality image with reduced luminance nonuniformity and color nonuniformity resulting from the shade of the recesses and protrusions of the diffusing means, while the degree of diffusion of the diffusing means is reduced to provide a bright image.

BRIEF DESCRIPTION OF DRAWINGS

FIG. 2a is an explanatory diagram representing the configuration of the aforementioned image display device wherein the optical path is unfolded in the horizontal direction, while

FIG. 8a is a plan view showing the schematic configuration of an HMD equipped with an image display device relating to another embodiment of the present invention, while

FIG. 9a is a plan view showing another HMD configuration, while

FIG. 17a is a cross sectional view showing an example of the configuration of the unidirectional diffusing plate applicable to the conventional image display device, while

DESCRIPTION OF EMBODIMENTS

Embodiment 1

The following describes an embodiment of the present invention with reference to the drawings.

(Image Display Device)

Figure 2A:
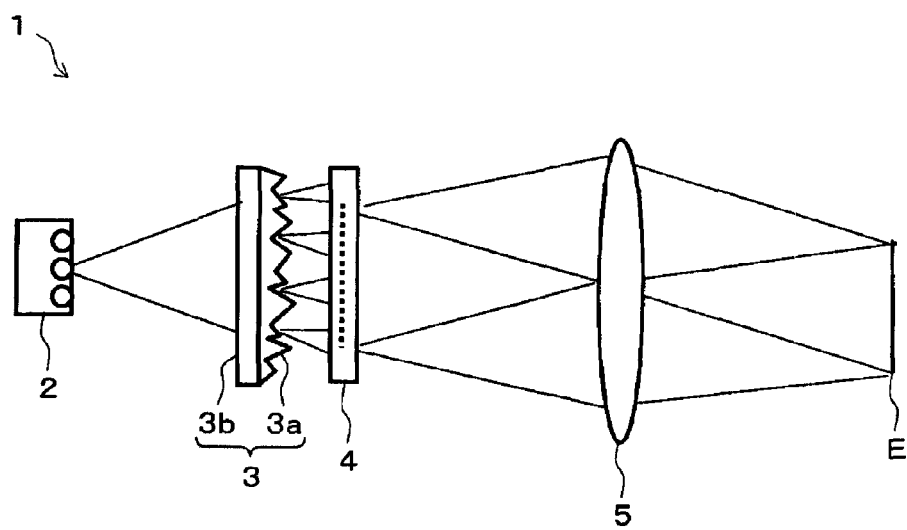
Figure 2B:
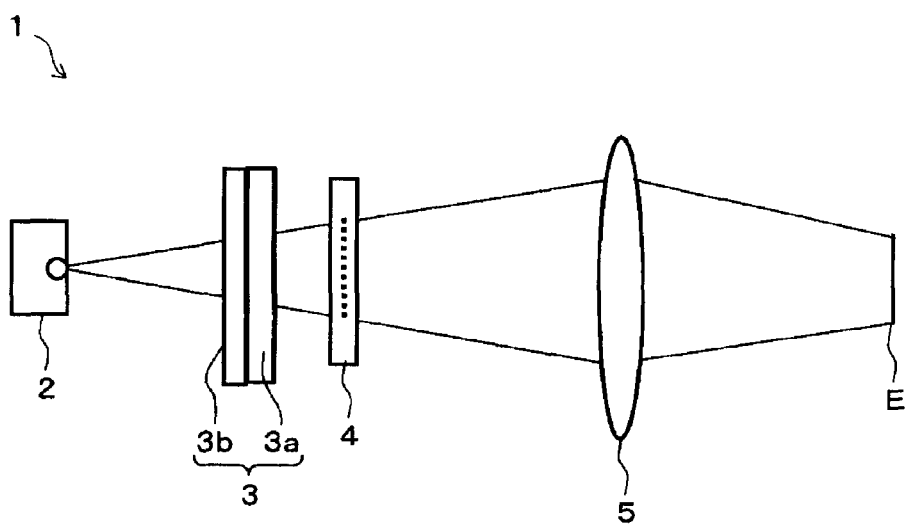
FIG. 2b is a explanatory diagram representing the configuration of the aforementioned image display device wherein the optical path is unfolded in the vertical direction.

FIGS. 2a and 2b are explanatory diagrams representing the conceptual configuration of the image display device 1 of the present invention wherein the optical path is unfolded. FIG. 2a demonstrates the structure with the optical path in the horizontal direction unfolded, and FIG. 2b shows the same with the optical path in the perpendicular direction unfolded. This image display device 1 includes a light source 2, diffusing means 3, display element 4, and lens 5.

The light source 2 is composed of LEDs (devices for three colors are formed in one integral element) that emit each of three colors, R (red), G (green) and B (blue), for example, and a point light source is formed. The LEDs for R, G, and B are arranged along the horizontal direction as viewed from the observer. In the present embodiment, the display element 4 to be described later is not equipped with a color filter. Thus, the light source 2 sequentially emits each of the R, G, and B on a time-shared basis.

The diffusing means 3 has a diffusing surface 3a wherein recesses and protrusions are formed in one direction with plural pitches of about 1 through 20 μm, for example, and forms a unidirectional diffusing plate to diffuse light traveling from the light source 2 in the one direction by the diffusion surface 3a and emit the resulting light. In the present embodiment, the diffusing means 3 is arranged close to the display element 4 to ensure that light will be diffused in the horizontal direction as viewed from the observer. The details of the diffusing means 3 will be described later.

The display element 4 includes a plurality of pixels A (FIG. 4) and a light-shielding section BM (FIG. 4) formed around these pixels A. The display element 4 is an optical modulation element that modulates light traveling from the diffusing means 3 with the pixels A to display an image. In the present embodiment, the display element 4 is made of a transmission type LCD devoid of R, G, and B color filters. The display element 4 devoid of color filters provides a high transmittance and allows display of a bright image. The display element 4 is arranged such that the long-side direction of the display region extends along the horizontal direction.

The lens 5 has a positive optical power, for example, and guides light of an image traveling from the display element 4 to the optical pupil E to constitute an ocular lens system (optical system for observation) which makes an observer observe a virtual image of the image at the position of the optical pupil E. To be more specific, the lens 5 forms an optical pupil E so that an observer can observe an image displayed by display element 4 as a virtual image.

In the aforementioned configuration, light emitted from the light source 2 which is almost a point light source is diffused in one direction (in the horizontal direction) by the diffusing means 3. After that, the light is modulated by the display element 4, and is emitted as image light therefrom. This image light is led to the optical pupil E through the lens 5. It allows an observer to observe a virtual image of the image displayed by the display element 4, at the position of the optical pupil E. In this case, synchronously with the emission of the light of R, G, and B colors by the light source 2, each of the pixels of the display element 4 is driven, which allows the observer to observe a color image.

Use of the point light source as the light source 2 eliminates the need of increasing the degree of diffusion to reduce the luminance nonuniformity of the light source, as compared to the case of a surface light source, and provides a bright image to be observed. Further, such a large current as that for driving the surface light source need not be supplied to the light source 2. This signifies saving of power consumption.

(Diffusing Means)

The following describes the details of the diffusing means 3. As shown in FIGS. 2a and 2b, the surface on the side opposite the diffusing surface 3a of the diffusing means 3 is a non-diffusing surface 3b. In the present embodiment, the diffusing means 3 is arranged such that the diffusing surface 3a faces the display element 4. To put it another way, the non-diffusing surface 3b of the diffusing means 3 forms a light-incident surface where light from the light source 2 enters, and the diffusing surface 3a forms a light-outgoing surface. The following describes the reason for this arrangement of the diffusing means 3.

For example, under the condition that the diffusing means 3 is arranged with the diffusing surface 3a formed of recesses and protrusions facing the light source 2, when light emitted from light source 2 and reflected by non-diffusing surface 3b of the diffusing means 3 forms backside reflection light and the backside reelection light reaches the diffusing surface 3a again, the light can be totally reflected. In this case, the luminance nonuniformity will be increased because the light totally reflected by the diffusing surface 3a does not enter the display element 4. However, if the diffusing means 3 is arranged such that the diffusing surface 3a faces the display element 4, it is possible to reduce the amount of the light returned by the backside reflected light (the light reflected by the diffusing surface 3a and traveling toward the non-diffusing surface 3b), with the result that the aforementioned luminance nonuniformity can be reduced.

Figure 3:
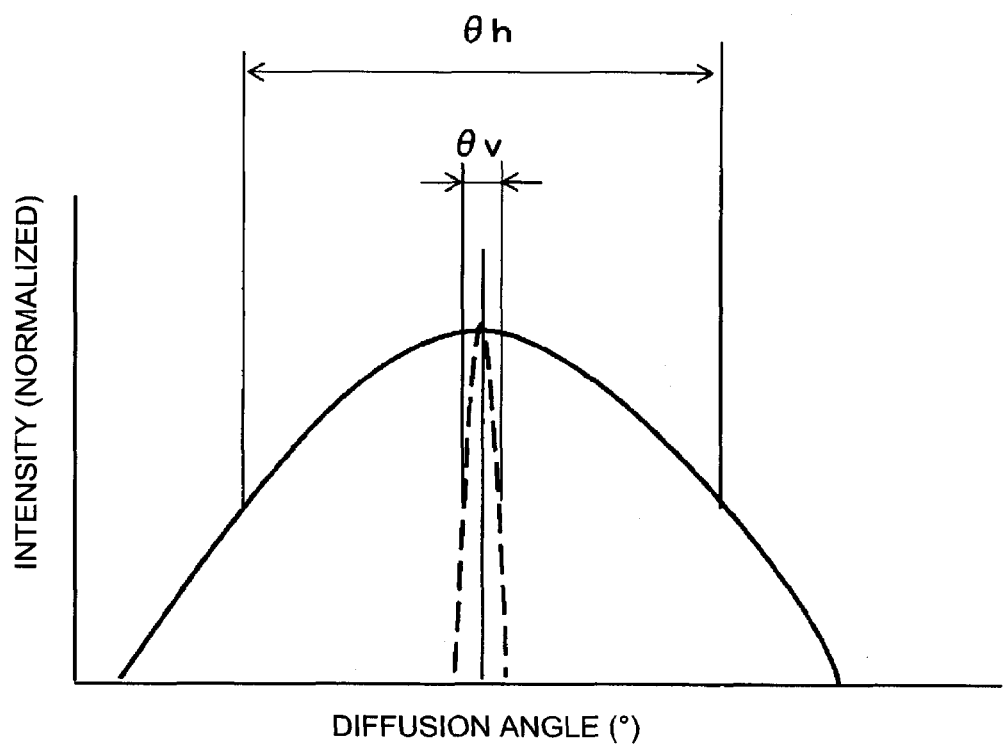
FIG. 3 is an explanatory diagram showing the diffusion characteristics of the diffusing means of the aforementioned image display device.

Incidentally, FIG. 3 is an explanatory diagram showing the diffusion characteristics of the diffusing means 3. Assume that θh denotes the degree of diffusion of the diffusing means 3 in the horizontal direction as viewed from the observer (also referred to as "in the lateral direction"), and θv indicates the degree of diffusion of the diffusing means 3 in the vertical direction as viewed from the observer (also referred to as "in the longitudinal direction"). In this case, the degree of diffusion of the diffusing means 3 can be expressed as θh=40 degrees and θv=0.2 degree in terms of intensity at half maximum. Namely, the diffusing means 3 allows the incident light to be diffused within 40 degrees in the lateral direction and 0.2 degree in the longitudinal direction, as viewed from the observer, by the diffusing surface 3a (FIGS. 2a and 2b) made of recesses and protrusions.

As described above, the diffusing means 3 hardly allows the incident light to be diffused in the longitudinal direction as viewed from the observer. Thus, the diffusing surface 3a has no ruggedness in the longitudinal direction as shown in FIG. 2b, and has a structure of recesses and protrusions in the lateral direction wherein random ruggedness is formed, as shown in FIG. 2a. When the diffusing means 3 allows the incident light to be diffused in one direction (in the lateral direction), the size of the optical pupil E will be 10 mm, for example, in the lateral direction and 1.5 mm, for example, in the longitudinal direction. The light is converged in the longitudinal direction wherein the optical pupil E is smaller, and this ensures a bright image (virtual image) to be observed by the observer. In the meantime, in the lateral direction wherein the optical pupil E is greater, easier observation of the image is ensured for the observer.

In the present embodiment, θh=40 degrees and θv=0.2 degree, as described above. The degree of diffusion of the diffusing means 3 in the diffusing direction is ten or more times larger than that in the direction perpendicular to the diffusing direction. Thus, the degree of diffusion in the perpendicular direction to the diffusing direction is made relatively smaller than that in the diffusing direction of so that the incident light is hardly diffused in the perpendicular direction. This arrangement provides the observer with a bright image.

(Reduction in Luminance Nonuniformity and Color Nonuniformity)

The following describes the conditions for reducing the luminance nonuniformity and color nonuniformity of an image to be observed, caused by the shade of the recesses and protrusions on the diffusing surface 3a of the diffusing means 3.

The diffusing means 3 formed of a unidirectional diffusing plate is created, for example, by forming a structure of recesses and protrusions along one axis with a plurality of pitches of about 1 to 20 μm on a transparent resin substrate having a thickness of about 0.1 mm. Here the diffusing means 3 with θh=40 degrees, for example, has a structure of recesses and protrusions having a maximum pitch of about 15 μm. If the structure of recesses and protrusions is observed by an ocular optical system with a focal length of 20 mm, for example, the viewing angle is about three minutes. This is greater than the viewing angle of one minute equivalent to the resolution of the human eye. Thus, if the intensity of the outgoing light is reduced because of the total reflection at the portion having a greater incident angle in the inclined portion of the recesses and protrusions, the reduction in the intensity is identified by the observer as a streak of shade. Further, the diffusing means 3 having a small degree of diffusion of θh=30 to 10 degrees is provided with a structure of recesses and protrusions with a pitch of about 20 μm. This ensures easier identification of the shades by the observer. Luminance nonuniformity and color nonuniformity are the result of superimposition of these shades on the image to be observed.

Thus, in the present embodiment, the following steps are taken to make an observer observe a high-quality image in which luminance nonuniformity and color nonuniformity are reduced, while the degree of diffusion of the diffusing means 3 is reduced and the image makes brighten.

Figure 1:
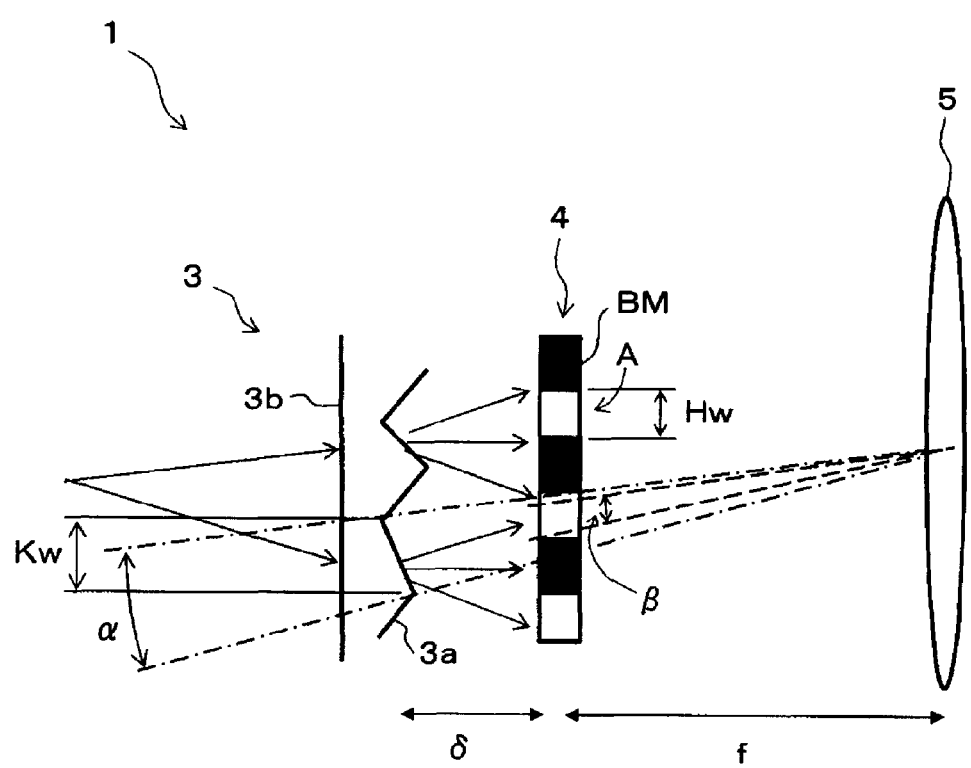
FIG. 1 is an explanatory diagram schematically representing various forms of parameters in an image display device as an embodiment of the present invention.

FIG. 1 is an explanatory diagram for schematically illustrating various parameters of the image display device 1 as the present embodiment Assume that Hw (mm) indicates the aperture width of the pixels A of the display element 4 in the diffusing direction of the diffusing means 3, Kw (mm) denotes the maximum pitch of the recesses and protrusions in the diffusing direction of the diffusing means 3, f (mm) shows the focal length of the lens 5, and δ (mm) represents the distance from the display surface of the display element 4 to the diffusing surface 3*a* of the diffusing means 3. In this case, the image display device 1 meets the following conditional expression (1):

$$Hw/f \leq \tan 1' \leq Kw/(f+\delta) \quad (1)$$

The display surface of the display element 4 is located close to the image surface of the lens 5 (focal length f). This arrangement forms the optical pupil E that supplies the observer with a virtual image.

In this case, $Hw/f \leq \tan 1'$ defines the conditions for ensuring that the shade of the recesses and protrusions of the diffusing means 3 is not easily identified by the observer. The expression: $\tan 1' \leq Kw/(f+\delta)$ defines the conditions for supplying the observer with a bright image by increasing the pitch of the recesses and protrusions of the diffusing surface 3*a* of the diffusing means 3, namely, by reducing the degree of diffusion. The following describes the details.

The resolution of the human eye is said to be equivalent to one minute in terms of viewing angle. To be more specific, when a human being observes an object at a viewing angle of 1 minute or more, the object can be identified as an image. In the meantime, $Kw/(f+\delta)$ is almost equivalent to the tangent of the viewing angle (viewing angle α in FIG. 1) of the maximum pitch of the recesses and protrusions in the diffusing direction of the diffusing means 3. Further, Hw/f is almost equivalent to the tangent of the viewing angle (viewing angle β in FIG. 1) of one pixel of the display element 4.

If $\tan 1' \leq \tan \alpha$ holds, namely, $\tan 1' \leq Kw/(f+\delta)$ holds, the pitches of the recesses and protrusions can be enlarged, and the degree of diffusion of the diffusing means 3 can be reduced, so that the observer is provided with a bright image. On the other hand, however, the shade of the recesses and protrusions of the diffusing surface 3*a* can be identified as a virtual image by the observer. This shade produces the luminance nonuniformity and color nonuniformity of the displayed image, as a result.

However, when the $\tan \beta \leq \tan 1'$, namely, $Hwf \leq /\tan 1'$ is satisfied, the aperture width of the pixels A of the display element 4 can be reduced, and a large part of the shade of the recesses and protrusions of the diffusing surface 3*a* (the shade of the recesses and protrusions at the viewing angle greater than the viewing angle corresponding to the resolution of the human eye) can be superimposed on the light-shielding section BM of the display element 4. Further, even if the shade has been superimposed on the pixels A of the display element 4, since the aperture width Hw of the pixels A is smaller than that corresponding to the resolution of the human eye, the observer cannot easily identify the image through the pixel.

Thus, when the conditional expression (1) has been met, the observer can be provided with the high-quality image with reduced luminance nonuniformity and color nonuniformity, whereas the degree of diffusion of the diffusing means 3 is reduced and a bright image is displayed.

When Hp is assumed to indicate the pitch of the pixels of the display element 4 in the diffusing direction of the diffusing means 3, the aperture efficiency Hw/Hp of the pixel of the display element 4 in the diffusing direction of the diffusing means 3 preferably meets the following conditional expression (1A)

$$0.3 \leq Hw/Hp \leq 0.8 \quad (1A)$$

The aperture efficiency Hw/Hp indicates the percentage of the transmission region (aperture) in the diffusing direction of the diffusing means 3 of the display element 4. If the aperture efficiency Hw/Hp is greater, the aperture width Hw is increased and the light-shielding section BM is reduced. If the aperture efficiency Hw/Hp is smaller, the aperture width Hw is reduced and the light-shielding section BM is increased. If the upper limit of the conditional expression (1A) has been exceeded, the shade of recesses and protrusions of the diffusing surface 3*a* will be likely to provide a more conspicuous influence. If the lower limit of the conditional expression (1A) cannot be reached, the volume of transmitting light will be reduced, with the result that the image will appear darker for the observer. The conditional expression (1A) provides a preferable value determined with consideration given to the influence of the shade resulting from the recesses and protrusions of the diffusing surface 3*a* and the brightness of the image.

Figure 4:
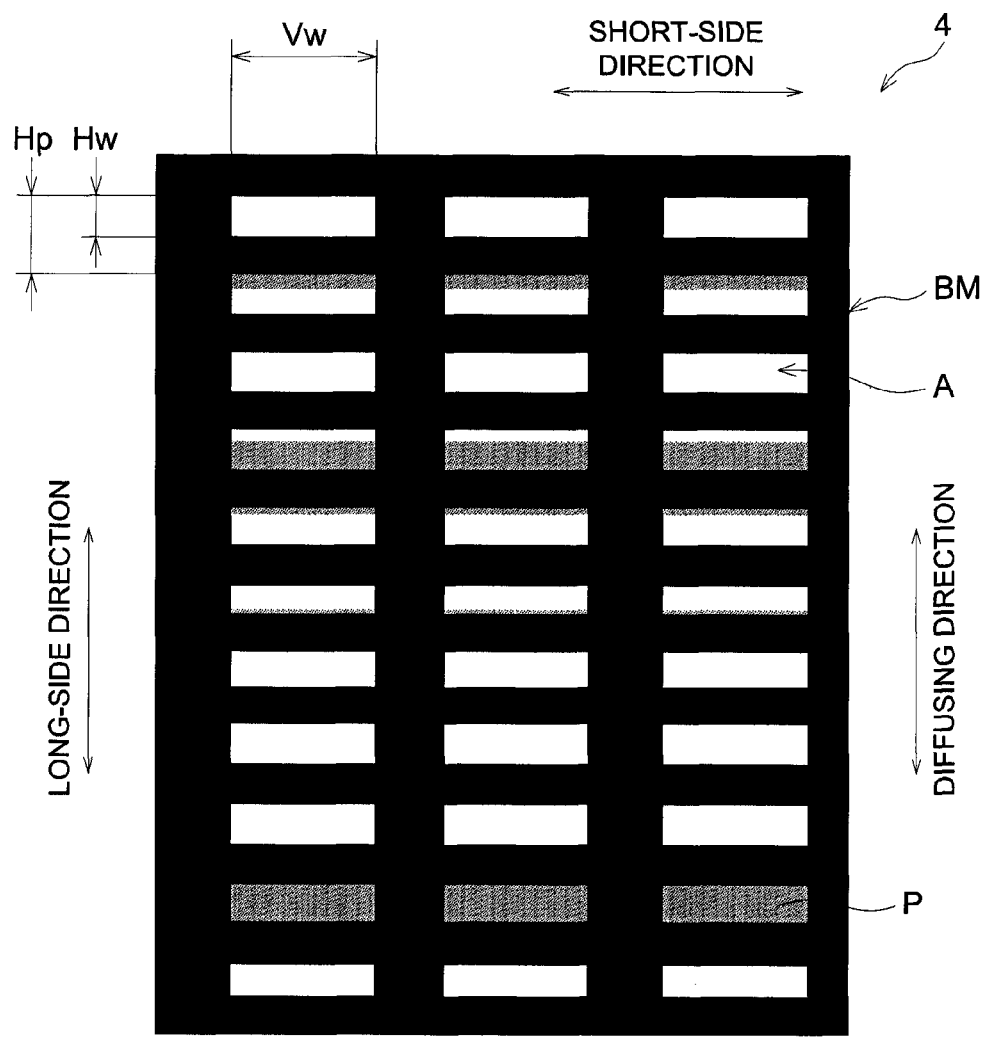
FIG. 4 is an explanatory diagram showing an enlarged view of the display region when the diffusing direction of the diffusing means extends along the long-side direction of the display region of the display element.

FIG. 4 is an explanatory diagram showing an enlarged view of the display region of the display element 4. It will be apparent that, when the conditional expression (1) is met, the shade P of the recesses and protrusions of the diffusing means 3 is hidden by the light-shielding section BM of the display element 4 and cannot be seen easily. This diagram clearly indicates the shade P of the recesses and protrusions for ease of explanation. As discussed above, the viewing angle of the pixels A is smaller than the viewing angle of one minute, which corresponds to the resolution of the human eye. This arrangement increases difficulties in the identification by the observer. When the image is actually observed, the image will be slightly out of focus due to the presence of the diffusing means 3. Thus, an average is taken for the shade P of the recesses and protrusions and bright portion (display of pixels A), with the result that observation difficulties will be increased.

It should be noted that the human eye cannot resolve the fine recesses and protrusions (at a pitch of 5 µm or less with a focal length of the lens 5 of 20 mm) of the diffusing means 3 which provides a viewing angle smaller than viewing angle of one minute corresponding to the resolution of the human eye. Thus, the shade of the recesses and protrusions having been reduced to an averaged level by the eyes cannot be easily observed.

In the present embodiment, the diffusing means 3 uses a unidirectional diffusing plate that diffuses the incident light within 0.5 degree in the direction perpendicular to the diffusing direction (wherein this unidirectional diffusing plate hardly diffuses the incident light in the vertical direction). The observer can also be supplied with a bright high-quality image by using, for example, a unidirectional diffusing plate that diffuses the incident light within 3 degrees in the perpendicular direction.

(Aperture Width Vw)

As shown in FIG. 4, when Vw (mm) indicates the aperture width of the pixels A of the display element 4 in the direction perpendicular to the diffusing direction of the diffusing means 3, the image display device 1 of the present embodiment meets the following conditional expression (2):

$$\tan 1' \leq Vw/f \quad (2)$$

Vw/f approximately corresponds to the tangent of the viewing angle of the pixels A of the display element 4 in the direction perpendicular to the diffusing direction of the diffusing means 3. The diffusing means 3 hardly diffuses the light in the direction perpendicular to the diffusing direction. Thus, by providing the expression: $\tan 1' \leq Vw/f$ and enlarging the aperture width of the pixels A in the direction perpendicular to the diffusing direction to form the aperture width greater than that corresponding to the human eye, the observer can be provided with a bright image.

(Distance δ)

Distance δ from the display surface of the display element 4 to the diffusing surface 3a of the diffusing means 3 is preferably set to ensure that the difference in visibility between the virtual image formed by the lens 5 of the diffusing means 3 and the virtual image of the image displayed on the display element 4 will be ten or more diopters. In the embodiment, it is set to ensure that the difference in visibility of the virtual images will be three diopters, for example. The following describes the reason for this arrangement.

In the first place, the following briefly describes the aforementioned diopter. Diopter is expressed by the reciprocal of the focal length of a lens represented in meters (1/m). It is commonly used as a unit representing the visibility, namely, the power of the lens (refractive power). Thus, in the present embodiment, when the virtual image of the image displayed on the display element 4 is located, for example, one meter in front of the observer's eyes (if the virtual image of the image is located at −1 d (diopter)), the virtual image through the lens 5 of the diffusing means 3 is located −4 d (25 cm in front of the eyes) or +2 d (infinite distance in front of the eyes (at 0 d it becomes an infinite distance in front of the eyes).

Ten diopters indicate the maximum adjustable range of the focus of the human eye. If the difference in the visibility between the virtual image through the lens 5 of the diffusing means 3 and virtual image of the display image of the display element 4 does not exceed ten diopters, not only the virtual image of the display image, but also the virtual image of the diffusing means 3 (including the shade of the recesses and protrusions) are kept within the range observable to the human eye. In the present invention, however, when the aforementioned conditional expression (1) is met, there will be difficulties in the identification of the shade of the recesses and protrusions of the diffusing means 3. This ensures a high-quality image to be viewed by the observer even when the distance δ is set to ensure that the difference in the visibility between both virtual images does not exceed ten diopters, and the diffusing means 3 is placed close to the display element 4. Thus, the efficiency in the use of light from the diffusing means 3 can be enhanced and a brighter image can be viewed by the observer, when the diffusing means 3 is placed close to the display element 4 and the device is designed in a compact and lightweight structure.

(Another Layout of the Diffusing Means)

The above description has been made with reference to the example wherein the diffusing means 3 is arranged to ensure that light will be diffused in the long-side direction of the rectangular display element 4 (in the direction of the pixels A arrayed along the long side). However, the diffusing means 3 can be arranged (by rotation) so that the diffusing direction will intersects with the long-side direction of the rectangular display region of the display element 4, for example.

When the diffusing means 3 allows the diffusing surface 3a of the recesses and protrusions to diffuse the incident light in one direction, the shade of the recesses and protrusions of the diffusing means 3 is generated as a streak in the direction perpendicular to the diffusing direction. In this case, for example, if the diffusing direction of the diffusing means 3 is matched with the long-side direction of the display region of the display element 4, the shade P of the recesses and protrusions of the diffusing means 3 will be superimposed on a plurality of pixels A located in the direction perpendicular to the diffusing direction, namely, in the short-side direction of the display region, as shown in FIG. 4. Thus, the shade will be split by the light-shielding section BM of pixels A only in the short-side direction.

Figure 5:
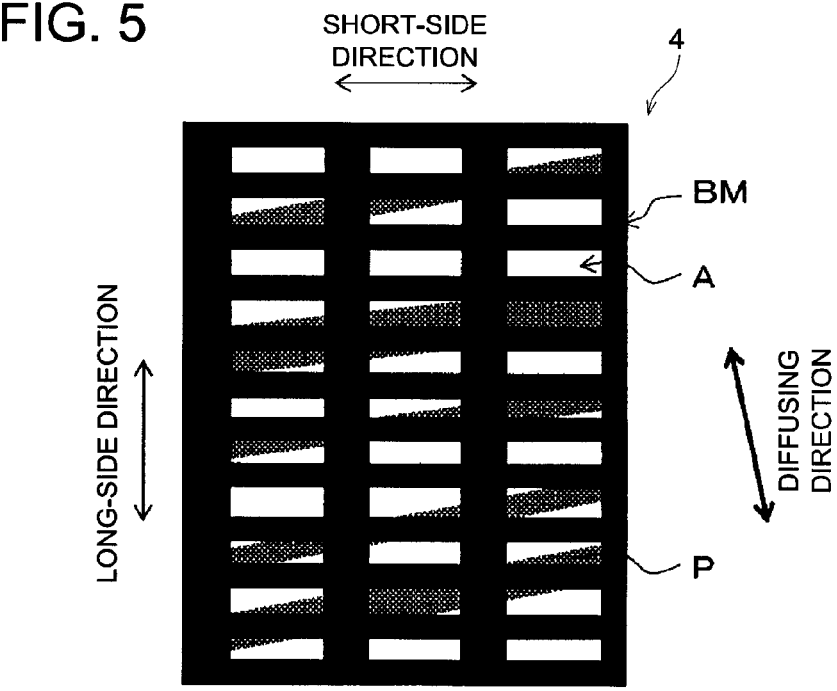
FIG. 5 is an explanatory diagram giving an enlarged view of the display region when the diffusing direction of the diffusing means inclines with the long-side direction of the display region of the display element.

FIG. 5 is an explanatory diagram giving an enlarged view of the display region of the display element 4 when the diffusing direction of the diffusing means 3 inclines at five degrees inclined with respect to the long-side direction of the display region of the display element 4. Even if the diffusing direction of the diffusing means 3 crosses the long-side direction of the display region of the display element 4, the shade P of the recesses and protrusions of the diffusing means 3 is superimposed on a plurality of pixels A located in the direction perpendicular to the diffusing direction. In this case, the shade is split by the light-shielding section BM around pixels A in both directions of the long and short sides of the display region, namely, in the inclined direction. This will increase the difficulty of the shade P of the diffusing means 3 being identified by the observer.

(Another Example Showing the Configuration of the Display Element)

The above description has been made with reference to an example of using the display element 4 not provided with color filters. It goes without saying that a display element provided with a color filter can be used. In this case, the light source 2 is only required to cause simultaneous emission of light from each of the R, G, and B LEDs.

Figure 6:
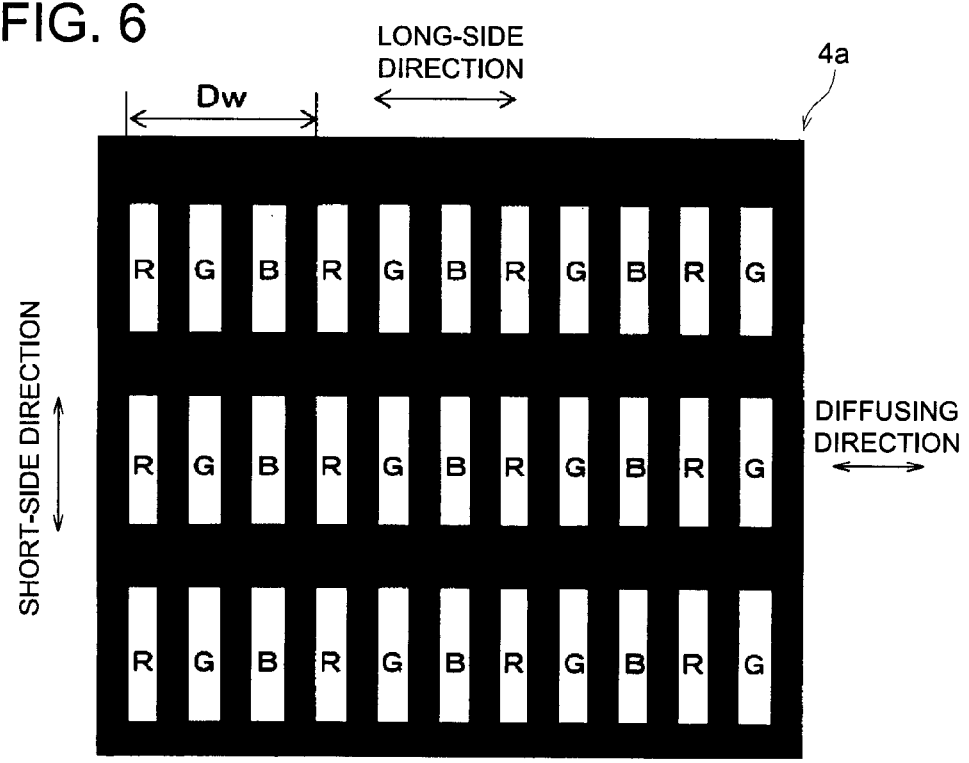
FIG. 6 is an explanatory diagram showing an enlarged view of a display region of the display element equipped with color filters.
Figure 7:
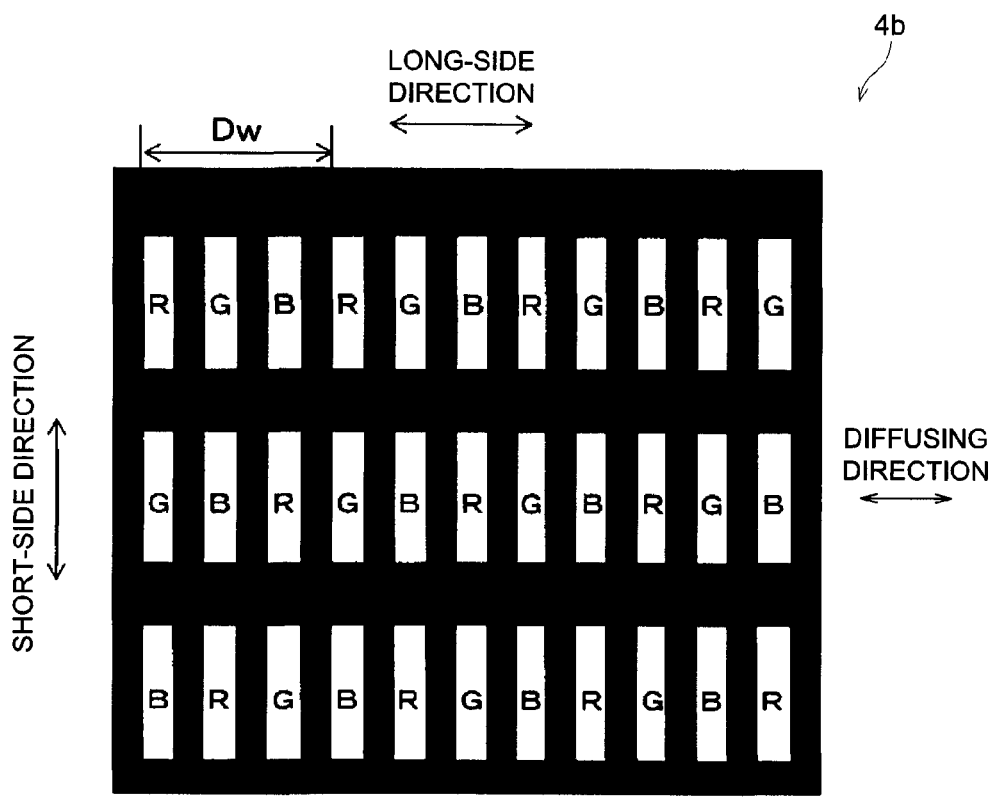
FIG. 7 is an explanatory diagram showing an enlarged view of the display region of another display element equipped with color filters.

For example, FIG. 6 is an explanatory diagram showing an enlarged view of a display region of the display element 4a equipped with color filters. In the display element 4a, filters are arranged in the order of R, G, and B in the long-side direction of the rectangular display region, and filters of one and the same color are located in the short-side direction of the rectangular display region. FIG. 7 is an explanatory diagram showing an enlarged view of the display region of another display element 4b equipped with color filters. In the display element 4b, filters are arranged in the order of R, G, and B in the long-side direction of the rectangular display region, and filters are also located in the short-side direction of the rectangular display region. If the diffusing direction of the diffusing means 3 is made to agree or intersect with the long-side direction of the display region, use of the display elements 4a and 4b equipped with color filters can increase the difficulty for the observer to view the shade of the recesses and protrusions of the diffusing means 3, similarly to the cases wherein the display element 4 is used.

In the display element 4b of FIG. 7 in particular, even if a streak-formed shade is formed in the direction perpendicular to the diffusing direction under the condition that, for example, the diffusing direction is the same as the direction of the long side of the display region, the specific color alone is not weakened (luminance is not reduced) because of this shade. Accordingly, this arrangement provides the observer with the high-quality image with further reduction in the luminance nonuniformity and color nonuniformity.

In the display elements 4a and 4b, assume that Dw (mm) indicates the pitch of the pixels A of the same color in the diffusing direction. Then $Dw \geq \tan \alpha$, namely, $Dw \geq Kw/(f+\delta)$ can hold, if the conditional expression (1) is met. To be more specific, in the display elements 4a and 4b, when the aperture width Hw of the pixels A of each of the R, G, and B is smaller, it is possible to increase the difficulty for the observer to view the shade of the recesses and protrusions of the diffusing means 3, similarly to the case wherein the display element 4 is used. This eliminates the need of making the value of Dw smaller than $\tan \alpha$.

Embodiment 2

The following describes another embodiment of the present invention with reference to the drawings.

(HMD Structure)

Figure 8A:
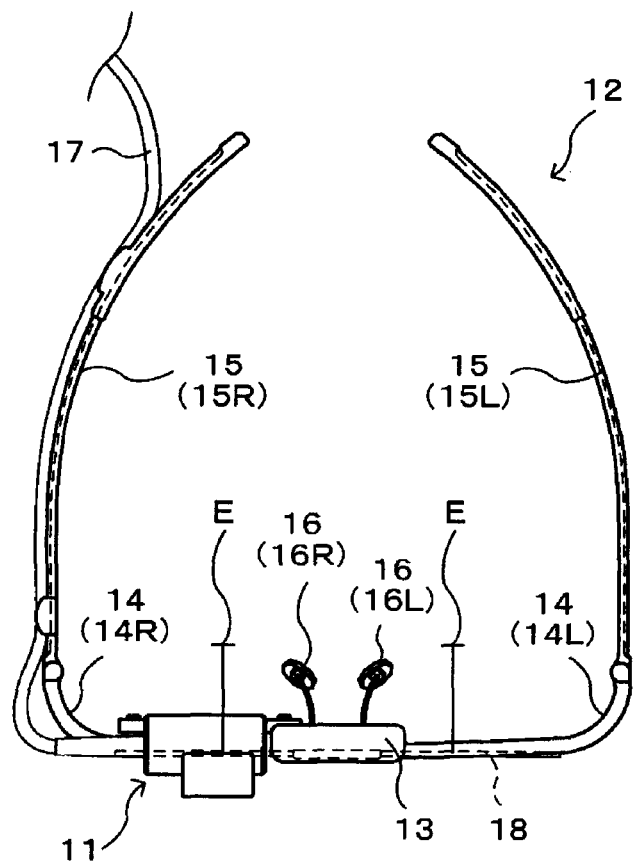
Figure 8B:
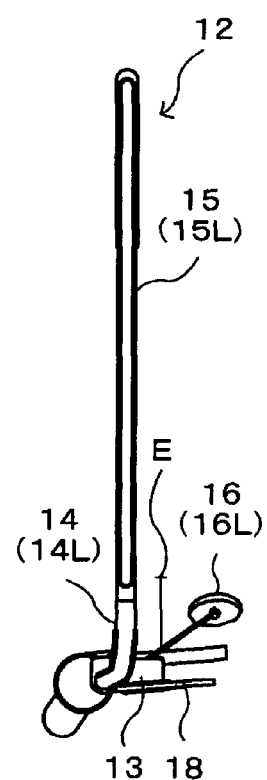
FIG. 8b is a side view of the HMD and FIG. 8c is a front view of the same.
Figure 8C:
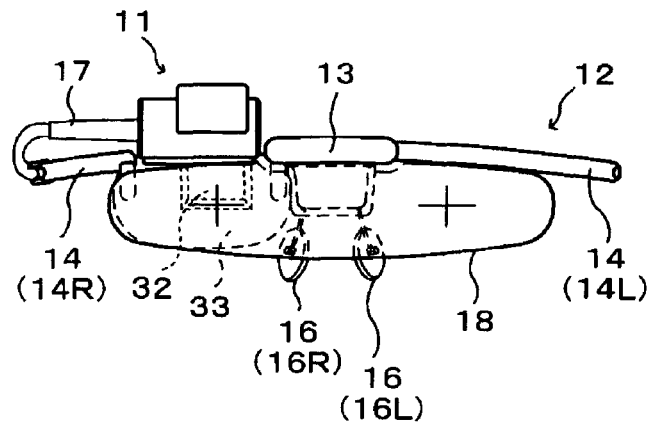

FIG. 8a is a plan view showing the schematic configuration of an HMD of the present embodiment, while FIG. 8b is a side view of the HMD, and FIG. 8c is a front view of the same. The HMD includes an image display device 11 and a supporting means 12 supporting the same. The general structure of the HMD is so designed that one (left one, for example) of the lenses has been removed from the general spectacles.

The image display device 11 allows the observer to view the image of the external world in the see-though mode, and displays the image to provide the observer with that image as a virtual image. This image display device 11 corresponds to the image display device 1 of the first embodiment. In the image display device 11 of FIG. 8c, the portion corresponding to the right-eye lens of the spectacles is made up of an ocular prism 32 and deflecting prism 33 which are bonded together, as will be described later. The detailed structure of the image display device 11 will also be described later.

The supporting means 12 is a supporting member which supports the image display device 11 in front of an eye of the observer (e.g., in front of the right eye), and includes a bridge 13, frames 14, temples 15, nose pads 16, cable 17, and control means for transmittance of external light 18. A pair of frames 14, temples 15, and nose pads 16 is provided on the right and left. When they are to be distinguished between the tight-hand side and left-hand side, they will be described as a right frame 14R, left frame 14L, right temple 15R, left temple 15L, right nose pad 16R, and left right nose pad 16L.

One end of the image display device 11 is supported by the bridge 13. The bridge 13 also supports the left frame 14L, nose pads 16 and control means for transmittance of external light 18 in addition to the image display device 11. The left frame 14L rotatably supports the left temple 15L. In the meantime, the other end of the image display device 11 is supported by the right frame 14R. In the right frame 14R, the end opposite the supporting side of the image display device 11 rotatably supports the right temple 15R. The cable 17 is used to supply the image display device 11 with an external signal (e.g., image signal and control signal) and electric power, and is provided along the right frame 14R and right temple 15R. The control means for transmittance of external light 18 is provided on the bridge 13 to control the transmittance of the external light (light of an external image), and is located in front of the image display device 11 (opposite the observer).

When the observer uses the HMD, the right temple 15R and left temple 15L are brought into contact with the right side and left side of the head of the observer and the nose pads 16 are applied to the nose of the observer. The observer wears the HMD on the head in the manner of wearing a pair of spectacles. If an image is displayed by the image display device 11 under this condition, the observer is allowed to view the image of the image display device 11 as a virtual image. At the same time, the observer can view the external image through the image display device 11 in a see-through mode.

In this case, if the transmittance of external light is set to the level of 50 percent or less, for example, in the control means for transmittance of external light 18, easier viewing of the image of the image display device 11 by the observer is ensured. Conversely, if the transmittance of external light is set to the level of 50 percent or more, the observer is allowed to have easier viewing of an external image. Accordingly, the transmittance of external light in the control means for transmittance of external light 18 should be set to an appropriate level in such a way as to ensure easy observation of the image of the image display device 11 and external image.

As described above, when the image display device 11 is supported by the supporting means 12, the observer is allowed to enjoy hands-free viewing of the image supplied by the image display device 11.

Figure 9A:
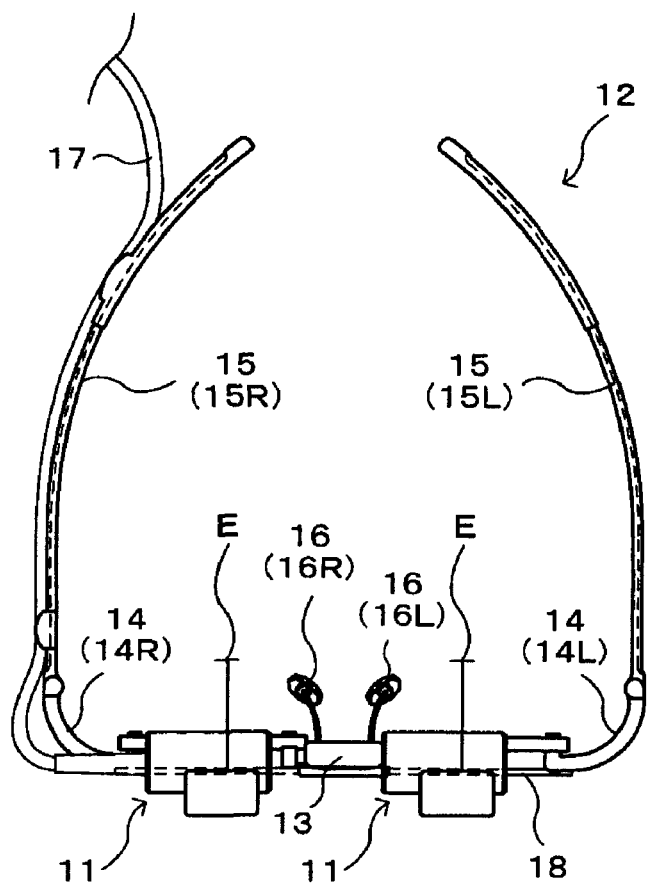
Figure 9B:
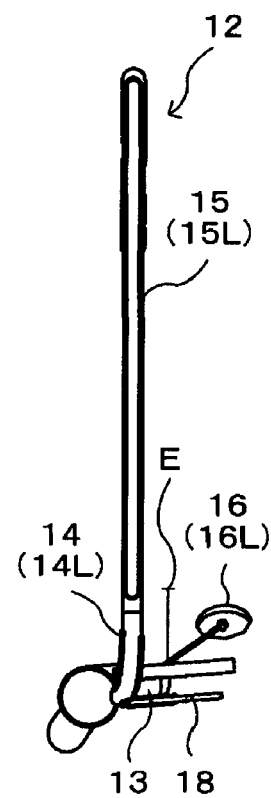
FIG. 9b is a side view of the HMD and FIG. 9c is a front view of the same.
Figure 9C:
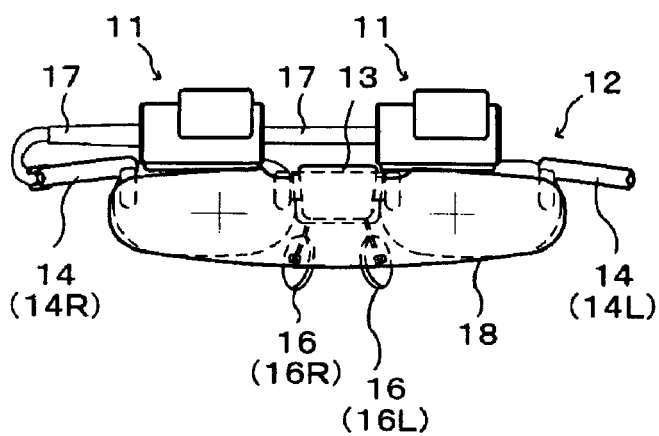

It should be noted that the HMD is not restricted to the one having only one image display device 11. For example, FIG. 9a is a plan view showing another HMD configuration, while FIG. 9b is a side view of the HMD and FIG. 9c is a front view of the same. As described above, the HMD can be provided with two image display devices 11, 11. In this case, the image display device 11 placed in front of the left eye is supported between the bridge 13 and left frame 14L. Further, the two image display devices 11, 11 are connected with each other by the cable 17, and external signals and others are supplied to two image display devices 11, 11 through the cable 17.

(Details of Image Display Device)

The following describes the details of the image display device 11.

Figure 10:
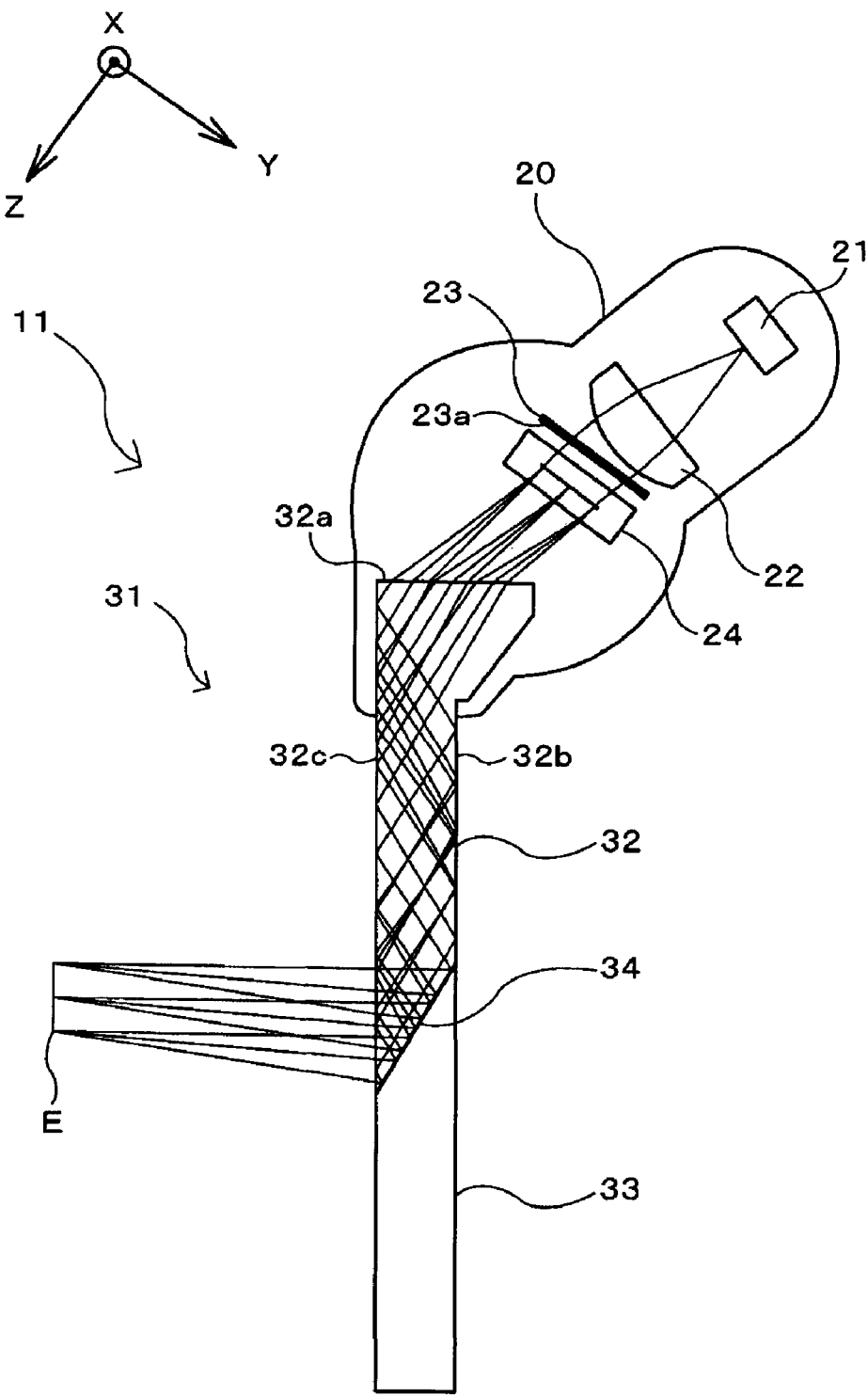
FIG. 10 is a cross sectional view representing the schematic configuration of the image display device.
Figure 11:
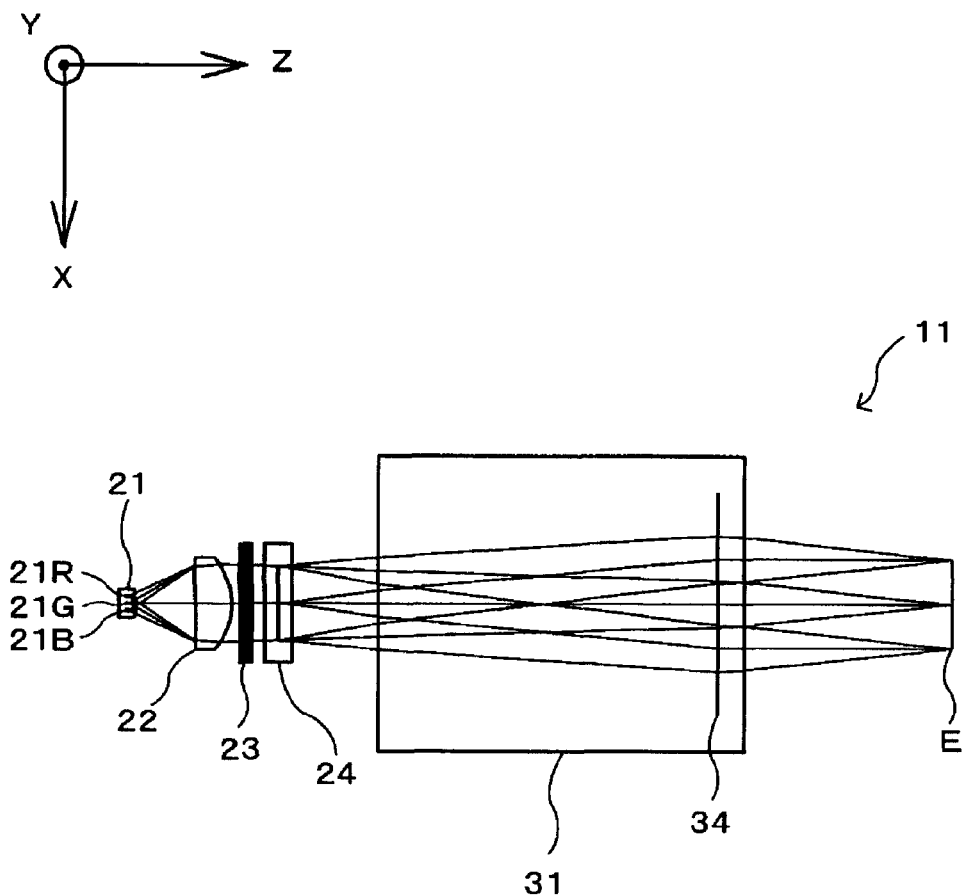
FIG. 11 is an explanatory diagram showing the optical path of the image display device unfolded optically in one direction.

FIG. 10 is a cross sectional view representing the schematic configuration of the image display device 11. FIG. 11 is an explanatory diagram showing the optical path of the image display device 11 unfolded optically in one direction. The image display device 11 includes a light source 21, light-converging lens 22, diffusing means 23, display element 24, and ocular optical system 31. As shown in FIG. 10, the light source 21, light-converging lens 22, diffusing means 23, and display element 24 are housed in a casing 20. Part of the ocular optical system 31 (part of the ocular prism 32 to be described later) is located inside the casing 20. The image display device 11 meets both the conditional expressions (1) and (2).

For the sake of expediency, the following defines the directions: Assume that the optical axis denotes the axis optically connecting between the center of the display region of the display element 24 and the center of the optical pupil E formed by the ocular optical system 31. Also assume that the Z-axis direction indicates the direction of the optical axis obtained by unfolding the optical path from the light source 21 to the optical pupil E, and the X-axis direction represents the direction perpendicular to the optical-axis incident surface of a hologram optical element 34 (to be described later) of the ocular optical system 31. The Y-axis direction is the direction perpendicular to the ZX plane. The optical-axis incident surface of the hologram optical element 34 indicates the plane (i.e., YZ plane) including the optical axis of the incident light to the hologram optical element 34 and the optical axis of the reflected light. The above-mentioned optical-axis incident surface may be called the incident surface in the following description.

The light source 21 is composed of a LED wherein elements for R, G, and B are integrated into one body, including three light-emitting chips emitting light of three colors of R, G, and B as light-emitting sections 21R, 21G, and 21B (FIG. 11). LEDs are less costly and designed in a compact structure. Further, the width of the emitted light wavelength is smaller, as will be described later. Thus, the LED provides high color purity. Accordingly, when the light source 21 is composed of the LED of R, G, and B, the image display device 11 with reduced costs and compact size can be achieved, and the observer is provided with an image of high color purity.

The light-emitting sections 21R, 21G, and 21B each have a size of about 0.3 mm square, and are arranged with a pitch of 0.5 mm along the X-axis direction. When providing the light-emitting sections 21R, 21G and 21B arranged in the X-axis direction as the diffusing direction of the diffusing means 23 (to be described later), colors of R, G, and B are mixed in the above-mentioned diffusing direction with the diffusing means 23. This reduces the intensity nonuniformity of each color on the optical pupil E, and therefore, reduces the color nonuniformity.

The light-emitting sections 21R, 21G, and 21B need not be arranged perfectly in a line in the X-axis direction. For example, part of the light-emitting sections 21R, 21G, and 21B may be displaced by 0.5 mm in the Y-axis direction. In this case, the light source 21 can be arranged in such a way that a greater number of light-emitting sections will be arranged in a straight line in the X-axis direction.

The light-converging lens 22 converges light traveling from the light source 21 in the direction (Y-axis direction) perpendicular to the diffusing direction of the diffusing means 23, and guides the light to the diffusing means 23. The light-converging lens 22 includes a cylindrical lens, for example. Use of the light-converging lens 22 allows the optical system for illuminating the display element 24 to be designed in a compact and lightweight structure. The optical power of the light-converging lens 22 in the direction (X-axis direction) parallel with the diffusing direction of the diffusing means 23 is zero or negative. This ensures that the light from the light source 21 is not converged in the X-axis direction. This allows the observer to be supplied with a high-quality image, without the luminance nonuniformity (intensity nonuniformity) being increased in the X-axis direction.

The light-converging lens 22 is arranged such that, after the light-converging lens converges light from the light source 21, the light diffused by diffusing means 23 effectively forms the optical pupil E. Further, the light-converging lens 22 and hologram optical element 34 (to be described later) are arranged such that the light source 21 and optical pupil E are conjugate with respect to the direction (Y-axis direction) perpendicular to the diffusing direction of the diffusing means 23. In the Y-axis direction of the optical pupil E, the light-emitting area (for example, 0.3 mm square) is formed slightly larger than the pupil formed at the image magnification in a conjugate relationship, by the diffusion of one degree caused in the diffusing means 23 and the diffusion of about two degrees caused in the display element 24. As a result, the optical pupil E has a size of 8 mm in the X-axis direction and 2 mm in the Y-axis direction in this embodiment.

As described above, in one direction (the X-axis direction), the optical pupil E has a size of 8 mm, which is greater than the human pupil (about 3 mm). This ensures easier viewing of the image by the observer. In the meantime, in the other direction (the Y-axis direction), the optical pupil E has a size of 2 mm, which is smaller than the human pupil. This permits the light from the light source 21 to be effectively converged into the optical pupil E in the above-mentioned direction, and the observer is provided with a bright image. In the present embodiment, the optical pupil is made smaller than the human pupil to provide a brighter image. If the optical pupil is small in one direction, a bright image can be provided, even if the optical pupil can be made larger than the human pupil.

In the Y-axis direction perpendicular to the diffusing direction of the diffusing means 23, the light source 21 and optical pupil E are positioned at conjugate positions with each other. This allows the size of the optical pupil E to be further reduced in the Y-axis direction, and permits the efficiency of using the light from the light source 21 to be increased in the Y-axis direction, whereby the observer is provided with a bright image. In the X-axis direction, the incident light is diffused widely by the diffusing means 23, and the conjugate relationship between the light source 21 and optical pupil E is not established. However, the light from the light source 21 can be used at higher efficiency by the conjugate arrangement, with the result that a bright image is displayed.

The diffusing means 23 is a unidirectional diffusing plate including a diffusing surface 23a in which recesses and protrusions are formed with a plurality of pitches in one direction, wherein light from the light source 21 is diffused and emitted in one direction by the diffusing surface 23a. The diffusing means 23 corresponds to the diffusing means 3 of the first embodiment. In the present embodiment, the diffusing means 23 is arranged close to the display element 24 such that its diffusing direction agrees with the horizontal direction (the X-axis direction) of the observer and that a difference in visibility between a virtual image formed by the ocular optical system 31 of the diffusing means 23 and a virtual image of an image displayed in display element is five diopters. The degree of diffusion in the X-axis direction of the diffusing means 23 is 30 degrees, for example. The opposing surface to the diffusing surface 23a in the diffusing means 23 forms a non-diffusing surface, similarly to the case of the first embodiment. The diffusing means 23 is arranged so that the diffusing surface 23a will face the display element 24.

The display element 24 is used to modulate the light emitted from the light source 21 through the diffusing means 23, in response to the image data, and to display an image. The display element 24 is provided with R-, G-, and B-color filters. The display element 24 has a matrix of pixels forming a region to allow transmission of light, and is composed of a transmission type LCD with a light-shielding section formed around each of the pixels. The display element 24 is arranged such that the long-side direction of the rectangular display region corresponds to the X-axis direction and the short-side direction corresponds to the Y-axis direction.

The ocular optical system 31 is an optical system for observation wherein the image light from the display element 24 i.e., the light corresponding to the image displayed in the display element 24 is led to the optical pupil E, so that the virtual image of the above-mentioned image is viewed by the observer at the position of the optical pupil E. The ocular optical system 31 includes an ocular prism 32 (first transparent substrate), deflecting prism 33 (second transparent substrate) and hologram optical element 34.

The ocular prism 32 totally reflects the image light from the display element 24 inside, and guides this light to the optical pupil E through the hologram optical element 34. At the same time, the ocular prism 32 allows transmission of external light and guides it to the optical pupil E. Together with the deflecting prism 33, the ocular prism 32 is composed of acrylic resin, for example. This ocular prism 32 is formed in such a way that the bottom end of the parallel flat plate is shaped like a wedge, and the top end is made thick. The ocular prism 32 is bonded with the deflecting prism 33 by adhesive in such a way as to sandwich the hologram optical element 34 arranged on the bottom end.

The deflecting prism 33 is formed of an approximately U-shaped parallel flat plate as in plan view (FIG. 8c). When bonded with the bottom end and surfaces on both side ends (end faces on the right and left) of the ocular prism 32, the deflecting prism 33 is integrated with the ocular prism 32 and is formed into an approximately parallel plate. When this deflecting prism 33 is bonded with the ocular prism 32, the observer is allowed to prevent distortion from occurring to the external image to be observed, through the ocular optical system 31.

To be more specific, for example, if the deflecting prism 33 is not bonded with the ocular prism 32, the external light is refracted when passing through the wedge-like bottom end of the ocular prism 32. This causes distortion to occur to the external image viewed through the ocular prism 32. However, when the deflecting prism 33 is bonded with the ocular prism 32 to form an integral approximately parallel plate, the refraction of the external light passing through the bottom end of the ocular prism 32 is offset by the deflecting prism 33. This prevents occurrence of the distortion to the external image to be observed in a see-through mode.

Each of the surfaces of the ocular prism 32 and deflecting prism 33 (two opposing surfaces of the parallel plate) can be flat or curved. If each of the surfaces of the ocular prism 32 and deflecting prism 33 is curved, the ocular optical system 31 can be provided with a function of a corrective lens.

The hologram optical element 34 is a hologram optical element of a volume phase type and a reflection type that diffracts and reflects the image light (light having wavelengths corresponding to three primary colors) emitted from the display element 24 and leads the image light to the optical pupil, whereby the image displayed by the display element 24 is enlarged and is led to the pupils of the observer as a virtual image. The hologram optical element 34 has an axi-asymmetric positive optical power, namely, the same function as that of a mirror with an aspheric concave surface having a positive power. This increases the degree of freedom in the layout of the optical members constituting the product to be arranged, and allows the product to be designed in a compact structure. At the same time, an effectively aberration-corrected image can be supplied to the observer.

(Operation of the Image Display Device)

The following describes the operation of the image display device 11. Light emitted from light source 21 is converged by the light-converging lens 22, then, is diffused by the diffusing means 23 to enter the display element 24 as uniform illumination light with excellent R, G, and B color mixture. The light having entered the display element 24 is modulated in each pixel according to the image data, and is outputted as image light. Thus, a color image is displayed on the display element 24.

The image light from the display element 24 enters the ocular prism 32 of the ocular optical system 31 from the top end face (32a). After having been totally reflected a plurality of times by two opposing surfaces 32b and 32c, this image light enters the hologram optical element 34. The light having entered the hologram optical element 34 is reflected at that position to reach the optical pupil E. This allows the observer to view an enlarged virtual image of the image displayed on the display element 24, at the position of the optical pupil E.

In the meantime, the ocular prism 32 and deflecting prism 33 almost completely permit passage of the external light, and this allows the observer to view the external image. Thus, the virtual image of the image displayed on the display element 24 is observed in the form partly superimposed with the external image.

As described above, the image display device 11 permits the image light emitted from the display element 24 to be totally reflected inside the ocular prism 32 so that the light is led to the hologram optical element 34. This structure allows the thickness of the ocular prism 32 and deflecting prism 33 to be about 3 mm, similarly to the case of the commonly used lenses of the spectacles. Thus, the image display device 11 can be designed in a compact and lightweight structure. Further, use of the ocular prism 32 capable of totally reflecting the image light from the display element 24 ensures a high transmittance of external light, with the result that the observer is provided with a bright external image.

The hologram optical element 34 serves as a combiner that leads the image light from the display element 24 and external light to the pupils of the observer simultaneously. Thus, the observer can simultaneously view the image provided by the display element 24 and external image, through the hologram optical element 34.

In the present embodiment, the difference in visibility between the virtual image provided by the ocular optical system 31 of the diffusing means 23 and the virtual image displayed on the display element 24 is five diopters. Not only the virtual image of the display image but also the virtual image provided by the ocular optical system 31 of the diffusing means 23 are kept within the range visible to the human eye (without exceeding ten diopters). However, when the conditional expressions shown in the first embodiment is met, it becomes difficult to visually identify the shade of the recesses and protrusions of the diffusing means 23. Thus, even when the diffusing means 23 is placed close to the display element 24, luminance nonuniformity and color nonuniformity occurring to the virtual image of the displayed image can be reduced, with the result that a bright high-quality image (virtual image) can be viewed by the observer.

Especially the image display device 11 that allows the external image to be viewed in a see-through mode as in the present embodiment is required to ensure easy viewing of the display image (virtual image) superimposed on the external image as a bright image by the observer. Thus, meeting the conditional expressions of the first embodiment is very effective, especially in the see-through mode image display device 11 and HMD.

(Characteristics of Light Source and Hologram Optical Element)

The following describes the characteristics of the light source 21 and hologram optical element 34.

Figure 12:
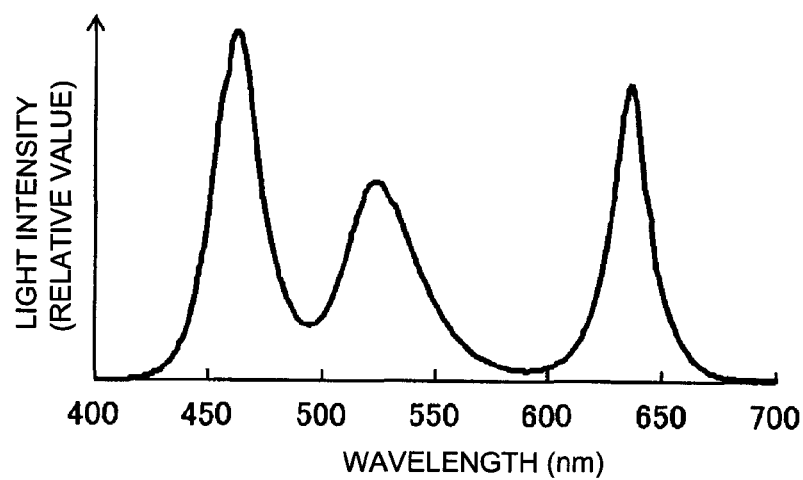
FIG. 12 is an explanatory diagram showing the spectral intensity characteristics of the light source of the image display device.

FIG. 12 is an explanatory diagram showing the spectral intensity characteristics of the light source 21, namely, the relationship between the wavelength of the outgoing light and light intensity. The light source 21, for example, emits light having three wavelength bands, 462±12 nm, 525±17 nm and 635±11 nm at the peak wavelength of the light intensity and wavelength width of the light intensity at half maximum. The light intensity plotted on the vertical axis of FIG. 12 is given in the relative value wherein the maximum light intensity of light B is assumed as 100.

The peak wavelength of the light intensity is defined as the wavelength at which the light intensity has reached the peak level. The wavelength width of the light intensity at half maximum is defined as the wavelength width at which the light intensity is the half value of the peak light intensity. The light intensity for R, G, and B of the light source 21 can be adjusted with consideration given to the diffraction efficiency of the hologram optical element 34 and light transmittance of the display element 24, whereby display in white color can be implemented.

Figure 13:
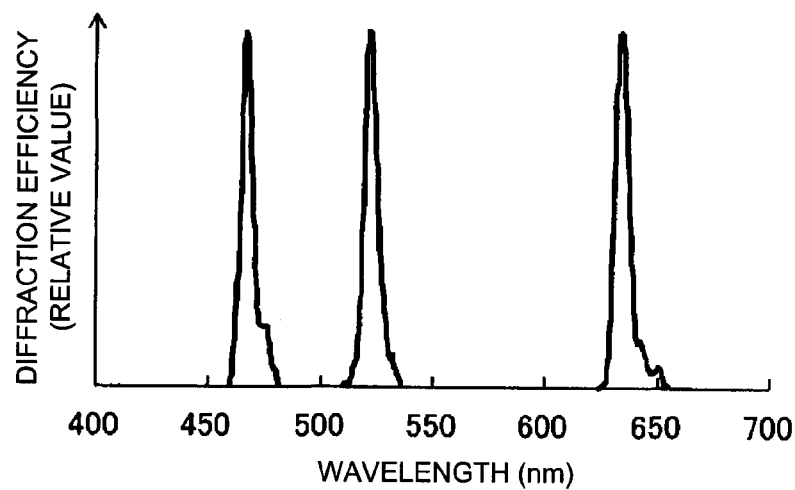
FIG. 13 is an explanatory diagram showing the wavelength dependency of the diffraction efficiency in the hologram optical element of the image display device.

FIG. 13 is an explanatory diagram showing the wavelength dependency of the diffraction efficiency in the holographic optical element 34. As illustrated, the hologram optical element 34, for example, is manufactured to diffract (reflect) the light in three wavelength bands, 465±5 nm (light B), 521±5 nm (light G), and 634±5 nm (light R) at the peak wavelength of diffraction efficiency and the wavelength width of the diffraction efficiency at half maximum. Here the peak wavelength of diffraction efficiency is defined as the wavelength at which the diffraction efficiency reaches the peak level, and the wavelength width of the diffraction efficiency at half maximum refers to the wavelength width when the diffraction efficiency has reached the half value of the peak diffraction efficiency. The diffraction efficiency of FIG. 13 is given in the relative value wherein the maximum diffraction efficiency of light B is assumed as 100.

As described above, the hologram optical element 34 is designed to diffract only the light of a specific wavelength having a specific incident angle, and does not affect transmittance of the external light. This enables the observer to view the external image in the same way as usual, through the ocular prism 32, hologram optical element 34, and deflecting prism 33.

In the hologram optical element 34 of volume phase type and reflection type, the diffraction efficiency is high and the half-value wavelength width of the peak diffraction efficiency is small, as shown in FIG. 13. Accordingly, the image light from the display element 24 is diffracted and reflected by the hologram optical element 34, using such a hologram optical element 34, and is led to the optical pupil E. This structure supplies the observer with a bright image of high color purity. Further, the transmittance of the external light is also increased. Thus, the observer is provided with a bright external image. To be more specific, the observer is supplied with an image of higher visibility superimposed on the bright external image.

Further, from the above-mentioned numerical relationship, the peak wavelength of the diffraction efficiency of the hologram optical element 34 can be said to be approximately the same as the peak wavelength of the light intensity emitted from the light source 21. In this setting, the light with a wavelength and its peripheral wavelengths at which the light intensity reaches the peak out of light emitted from light source 21, is effectively diffracted by the hologram optical element 34. Thus, even when this light is superimposed on the external image, the observer is provided with a bright, easy-to-see image.

(Color Nonuniformity Reducing Effect)

In this embodiment, the optical pupil E is designed to have 8 mm in the X-axis direction and 2 mm in the Y-axis direction with the intensity at half maximum, as described above. To be more specific, the optical pupil E is greater in size in the X-axis direction, namely, the direction perpendicular to the incident surface (YZ plane) of the hologram optical element 34 than in the Y-axis direction, namely, the direction parallel to the above-mentioned incident surface. When the optical pupil E is set to this size, the observer can be provided with a high-quality image of reduced color nonuniformity, without much affected by the wavelength characteristics (wavelength selectivity) of the hologram optical element 34. The reason for that is described below.

The following describes the relationship between the incident angle in the hologram optical element 34 and the wavelength selectivity. In the hologram optical element 34 having an interference fringe that causes diffraction of the light with an incident angle greater than zero degree, the wavelength selectivity is shorter in the direction perpendicular to the incident surface than in the direction parallel thereto (namely, shift of the diffraction wavelength resulting from shift of the incident angle is smaller). To put it another way, the angle selectivity with respect to the shift of the incident angle to the interference fringe is smaller in the direction perpendicular to the incident surface than in the Y-axis direction parallel to the incident surface. This is because, when the light with an incident angle enters the interference fringe of the hologram optical element 34, the shift of the incident angle within the incident surface (YZ plane) is directly recognized as the angular shift of the incident angle, and therefore, directly affects the diffraction wavelength. However, the angular shift in the direction perpendicular to the incident surface is recognized as small angular shift of the incident angle, and therefore, its influence to the diffraction wavelength is small.

Thus, if the light has entered the interference fringe at an angle shifted from a prescribed incident angle, the angular shift in the direction parallel with the incident surface (Y-axis direction) causes greater shift in diffraction wavelength than the angular shift in the direction perpendicular to the incident surface (X-axis direction), under, the condition that those angular shift are same to each other (namely, the direction parallel with the incident surface exhibits greater wavelength selectivity).

Accordingly, when the optical pupil E is formed smaller in the Y-axis direction in which the diffraction wavelength changes greatly, the range of changes in the diffraction wavelength is reduced, and therefore, the color nonuniformity on the optical pupil E can be reduced more effectively. Further, the observer can be provided with an image of high color purity, even if the optical pupil E is formed larger in the direction perpendicular to the incident surface. It should be noted that, as for light traveling outside the optical-axis incident surface, the incident surface of the light is slightly unparallel with the optical-axis incident surface, but the angular shift in the direction perpendicular to the incident surface has a smaller impact on the diffraction wavelength, as described above. This prevents the color nonuniformity from being increased even when the above issue is considered with reference to the incident surface of the optical axis.

In the present embodiment, the diffusing direction of diffusing means 23 is set to the X-axis direction, which is perpendicular to the optical-axis incident surface of the hologram optical element 34. By setting the diffusing direction of the diffusing means 23 to the X-axis direction being perpendicular to the optical-axis incident surface or the direction almost parallel with the same, and by diffusing light in the direction where the wavelength selectivity of the hologram optical element 34 is smaller, as described above, the optical pupil E is increased in size in the above-mentioned direction, and the observer is provided with an easy-to-view image, whereas the color nonuniformity is kept suppressed. Further, the optical pupil E is smaller in the Y-axis direction parallel with the optical-axis incident surface than in the X-axis direction perpendicular to the optical-axis incident surface. This allows the light from the light source 21 to be converged effectively in the Y-axis direction and provides the observer with a bright image.

As described above, the three light-emitting sections 21R, 21G, and 21B of the light source 21 are arranged in the X-axis direction wherein the amount of diffusion is greater. This signifies that three light-emitting sections 21R, 21G, and 21B are arranged in the direction perpendicular to the optical-axis incident surface. The direction perpendicular to the incident surface corresponds to the direction in which the wavelength selectivity in the hologram optical element 34 is small. Therefore, by arranging the three light-emitting sections 21R, 21G, and 21B in the X-axis direction, it allows the colors to be mixed in the direction wherein the optical pupil E can be increased in size. Even when the light source 21 for emitting the three colors R, and B is used, the observer can be supplied with a high-quality image of reduced color nonuniformity.

Embodiment 3

The following describes still another embodiment of the present invention with reference to the drawings. For purposes of description, the same portions as the aforementioned second embodiment will be assigned with the same numerals of reference, and will not be described to avoid duplication.

Figure 14:
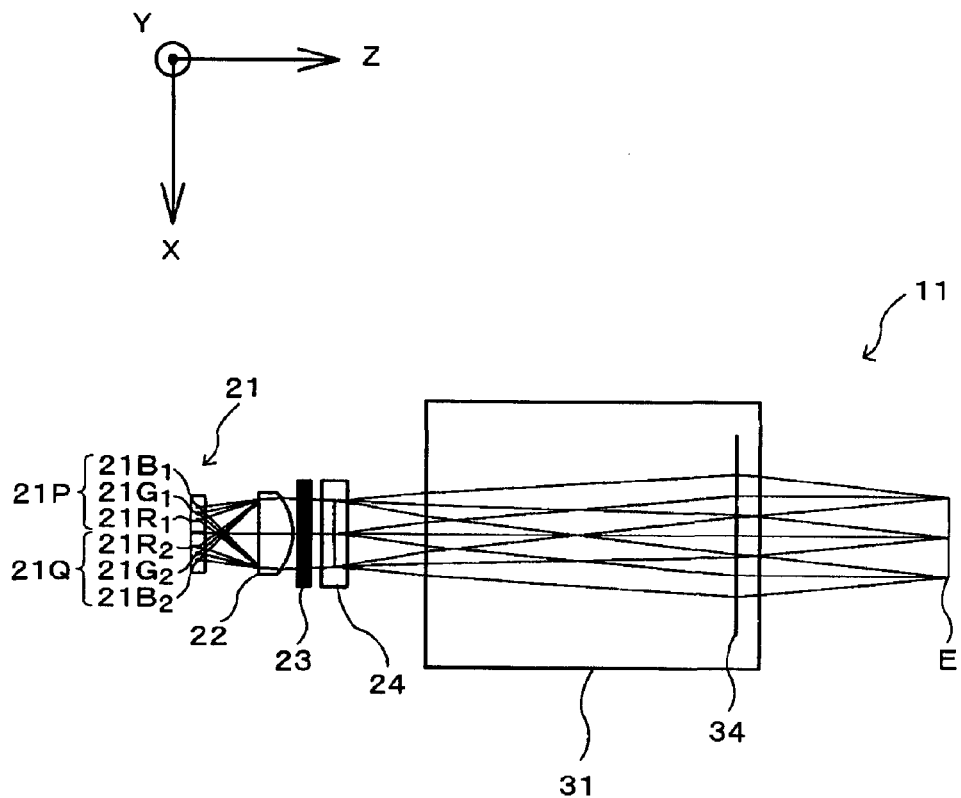
FIG. 14 is an explanatory diagram showing the optical path of the image display device relating to still another embodiment of the present invention, unfolded optically in one direction.

FIG. 14 is an explanatory diagram showing the optical path of the image display device 11 unfolded optically in one direction. The present embodiment is the same as the second embodiment except that the light source 21 is made of two light source groups 21P, 21Q.

The light source group 21P of the light source 21 is composed of a LED wherein elements for R, G, and B are integrated into one body, including three light-emitting sections 21R$_1$, 21G$_1$, and 21B$_1$ emitting light of three colors of R, G, and B. Similarly, the light source group 21Q is composed of a LED wherein elements for R, and B are integrated into one body, including three light-emitting sections 21R$_2$, 21G$_2$, and 21B$_2$ emitting light of three colors of R, G, and B. To put it another way, the light source 21 contains two sets of three light-emitting sections (LEDs) that emit light of R, G, and B colors.

The light-emitting sections of each of the light source groups 21P, 21Q are arranged in the direction perpendicular to the optical-axis incident surface (YZ plane) of the hologram optical element 34. Further, these light-emitting sections are arranged to be symmetric with respect to the aforementioned incident surface for each color (they are arranged symmetrically with respect to the optical axis of the ocular optical system 31). To put it in more detail, this arrangement is made in such a way that the light-emitting sections 21R$_1$, 21R$_2$ are plane-symmetric with respect to the aforementioned incident surface. On the outside thereof in the X-axis direction, light-emitting sections 21G$_1$, 21G$_2$ are arranged plane-symmetric with respect to the aforementioned incident surface. Still on the outside thereof in the X-axis direction, light-emitting sections 21B$_1$, 21B$_2$ are arranged plane-symmetrically with respect to the aforementioned incident surface. To put it another way, in the light source groups 21P, 21Q, light-emitting sections are arranged in the order wherein the wavelength of the outgoing light is reduced as one goes from the aforementioned incident-surface side toward the outside in the X-axis direction.

As described above, light-emitting sections are arranged plane-symmetric with respect to the aforementioned incident surface for each color. This arrangement ensures that the center of gravity of the total light intensity obtained by the addition of the intensifies of the light emitted from two light-emitting sections (for example, 21R$_1$ and 21R$_2$) for one and the same color, can be positioned within the plane of symmetry (within the aforementioned incident surface, and on the optical axis), for each of R, G, and B. Thus, the observer is provided with an image of reduced color nonuniformity at the center of the optical pupil E as a high-quality image of reduced aberration.

The surface serving as a center of the plane-symmetry of each light-emitting section may be a surface parallel with the aforementioned incident surface. To put it another way, the surface as the center of the plane-symmetry of each light-emitting section can be slightly misaligned from the incident surface in the X-axis direction. In this case, the observer is provided with an image of reduced color nonuniformity approximately at the center of the optical pupil E.

Further, as described above, the hologram optical element 34 is designed to diffract the image light having wavelengths of 465±5 nm (light B), 521±5 nm (light G), and 634±5 nm (light R) at the peak wavelength of diffraction efficiency and its half-value wavelength width. As described above, since the half-value wavelength width of diffraction efficiency is the same for each color, the light having a longer wavelength has a greater angular selectivity (a smaller shift in incident angle with respect to a change in wavelength). Thus, in each of the light source groups 21P, 21Q, light-emitting sections are arranged in such an order that, as one goes from the side of the optical-axis incident surface to the outside in the X-axis direction, the wavelength of the outgoing light is shorter. This arrangement presents the observer with an image of reduced color nonuniformity within the optical pupil E. The details of this arrangement will be described below.

Assume that $\lambda$ is the wavelength of the peak diffraction efficiency, n is the refractive index of the medium (interference fringe) of the hologram optical element 34, h is the thickness of the medium, and $\theta$ is the incident angle. The relationship of $\lambda = 2nh \cos \theta$ holds among these factors. If, in light B with shorter wavelength and light R with longer wavelength, those wavelengths shift by the same amount of 5 nm, for example, the percentage of the change in wavelength is 465/470 for light B, and 634/639 for light R. To put it another way, the percentage of the change in wavelength is smaller for the light R having a longer wavelength than for the light B having a shorter wavelength. Thus, the shift of the incident angle $\theta$ with respect to changes in wavelength is smaller (angular selectivity is greater) in the light R having a longer wavelength than in the light B having a shorter wavelength. Accordingly, if the wavelength widths of the R, and B of the light emitted from the light source 21 are the same, the size of the optical pupil E formed by diffraction with the hologram optical element 34 is smaller for the light having a longer wavelength. It should be noted that the optical pupil E is assumed to contain the entire range of the optical pupil for each color.

In the meantime, the intensity of the light emitted from the LED (the light-emitting sections) of the light source 21 is generally higher at a position closer to the center, and is lower as one goes away from the center. The light-emitting sections are arranged to be approximately conjugate to the optical pupil in the Y-axis direction. In the X-axis direction, however, the light-emitting sections are not conjugate with the optical pupil, because the emitted light is diffused by the diffusing means 23. The position of highest intensity in the optical pupil, however, is approximately equal to the position conjugate to the each light-emitting section, if there is assumed to be no diffusing means 23.

Accordingly, the center of the pupil for the longer wavelength (light R) having a smaller optical pupil is located at the center of the optical pupil E, and the center of the pupil for the shorter wavelength (light B) having a greater optical pupil is located outside the center of the optical pupil E. This arrangement ensures that the difference in the intensity due to the position of the pupil inside the optical pupil E can be reduced for each color. The following describes this mechanism in more detail.

Figure 15:
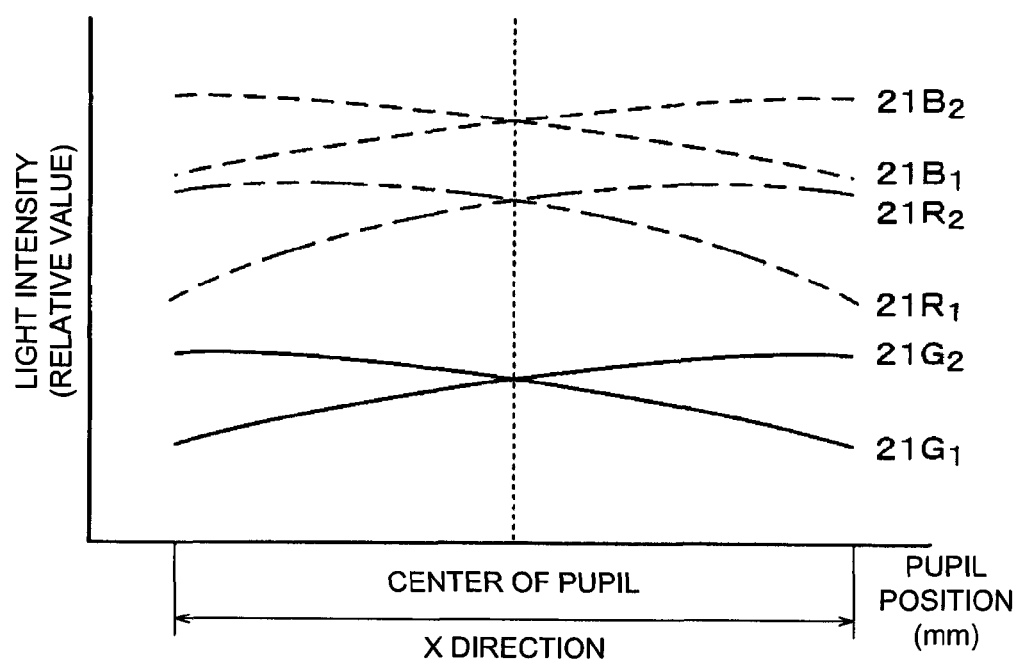
FIG. 15 is an explanatory diagram showing the relationship between the position of the optical pupil in the X-axis direction and the intensity of light.

FIG. 15 is an explanatory diagram showing the relationship between the position of the optical pupil E in the X-axis direction and the light intensity. The light intensity is represented in relative values for the same color. Further, the curves indicated by 21R$_1$, 21R$_2$, 21G1, 21G$_2$, 21B$_1$, and 21B$_2$ in the drawing correspond to the beams of light emitted from the light-emitting sections 21R$_1$, 21R$_2$, 21G1, 21G$_2$, 21B$_1$, and 21B$_2$, respectively.

As described above, the angular selectivity of the hologram optical element 34 ensures that the optical pupil is smaller as the wavelength is longer. As shown in FIG. 15, the light having a longer wavelength exhibits a greater difference in intensity due to the position of the pupil (i.e., the difference in intensity between the center and edge of the optical pupil E is greater). Conversely, the light having a shorter wavelength has a greater size in the optical pupil E, and therefore, exhibits a smaller difference in intensity due to the position of the pupil.

Further, because the light-emitting section for emitting the light of longer wavelength is arranged closer to the optical-axis incident surface, the position of higher light intensity is closer to the center of the optical pupil E for the light having a longer wavelength. Conversely, the light-emitting section for emitting the light of shorter wavelength is arranged further away from the optical-axis incident surface. Accordingly, the position of higher light intensity is around the optical pupil E.

To put it another way, the light of longer wavelength has a greater difference in intensity due to the position of the pupil. However, the light-emitting sections are arranged in such an order that, as one goes from the optical-axis incident surface to the outside in the X-axis direction, the wavelength of the outgoing light is reduced, to locate the position of higher light intensity at a closer position to the center of the optical pupil E for the light of longer wavelength. This arrangement ensures that the difference in intensity due to the position of the pupil, namely, reduce the difference in intensity between the center and edge of the optical pupil E, is reduced for the light of longer wavelength. This arrangement provides the observer with an image of reduced color nonuniformity over the overall area of the optical pupil E (both the center and periphery of the pupil).

Further, since the light-emitting section for emitting the light of longer wavelength is arranged closer to the optical-axis incident surface, the efficiency of utilizing the light on the optical pupil E can be improved. In the meantime, when the light-emitting section for emitting the light of shorter wavelength is arranged further away from the optical-axis incident surface, there is a smaller difference between the peak intensity and peripheral intensity, which does not deteriorate the efficiency of utilizing the light significantly. Therefore, the difference in intensity within the optical pupil E of each color is reduced and the luminance nonuniformity is also reduced.

The light-emitting sections of the light source groups 21P, 21Q are arranged in the X-axis direction in the descending order of diffusion by the diffusing means 23 (the shorter the wavelength, the greater the diffusion). This further reduces the difference in intensity for each color on the optical pupil E and also reduces the color nonuniformity. To be more specific, the observer is provided with an image of high color purity.

The above description uses an example wherein two sets of R, G, and B light-emitting sections are provided, and the light source 21 is made up of the light source groups 21P, 21Q wherein each set is formed into an individual package. However, each set need not always be formed into one package. The colors R, G, and B are mixed more effectively as the distance of the light-emitting point is closer, with the result that a brighter image can be provided. Accordingly, in this respect, each set of the light source groups is preferably formed into one package, because the distance of each light-emitting section can be easily reduced.

From the viewpoint of reducing the color nonuniformity, the image display device 11 of the present embodiment can be designed in the following configuration. The light-converging lens 22 of the image display device 11 can be a cylindrical lens power-less in the direction wherein the light-emitting sections are arrayed (in the X-axis direction), or a lens having negative power in the aforementioned arrayed direction (in the X-axis direction). In the former case, the percentage of enlarging the distance among light-emitting sections of R, G, and B color is reduced. Accordingly, an image of reduced color nonuniformity can be obtained, with the degree of diffusion being reduced. In the latter case, a bright image is obtained, with the color nonuniformity further reduced.

Embodiment 4

Referring to the drawings, the following describes still a further embodiment of the present invention. The same members as the aforementioned second or third embodiment will be assigned with the same reference numerals, and will not be described.

Figure 16:
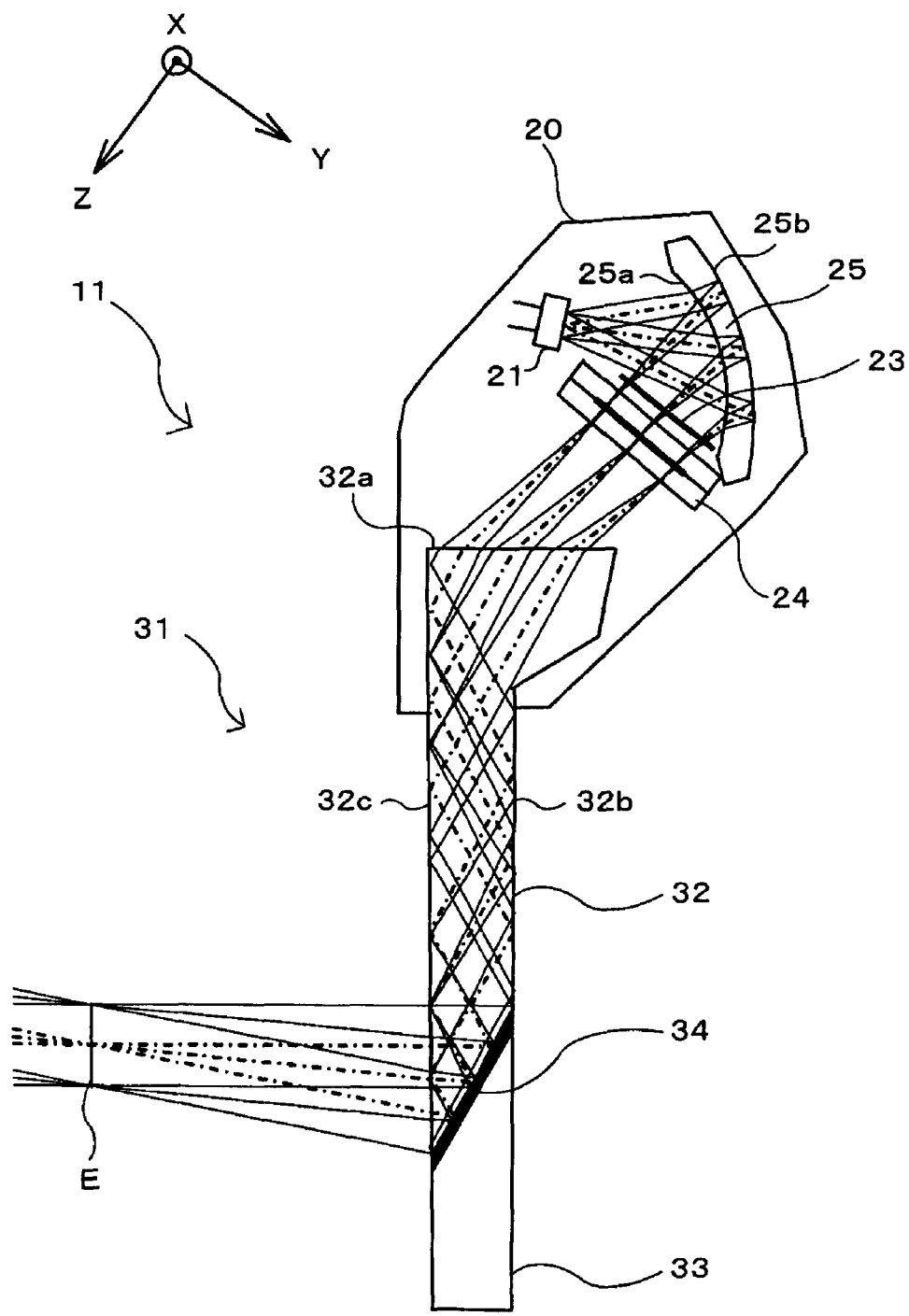
FIG. 16 is a cross sectional view showing the schematic configuration of the image display device relating to a further embodiment of the present invention.
Figure 17A:
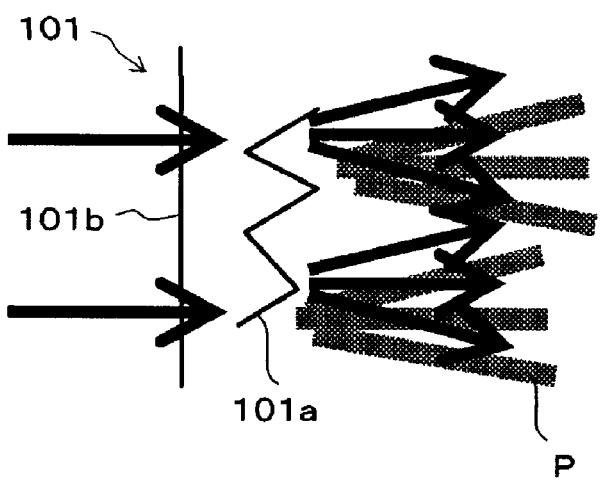
Figure 17B:
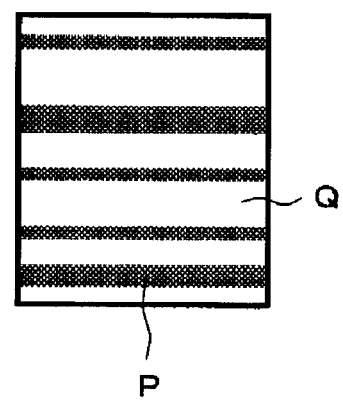
FIG. 17b is an explanatory diagram showing the shade of the unidirectional diffusing plate being superimposed on the observed image.
Figure 18:
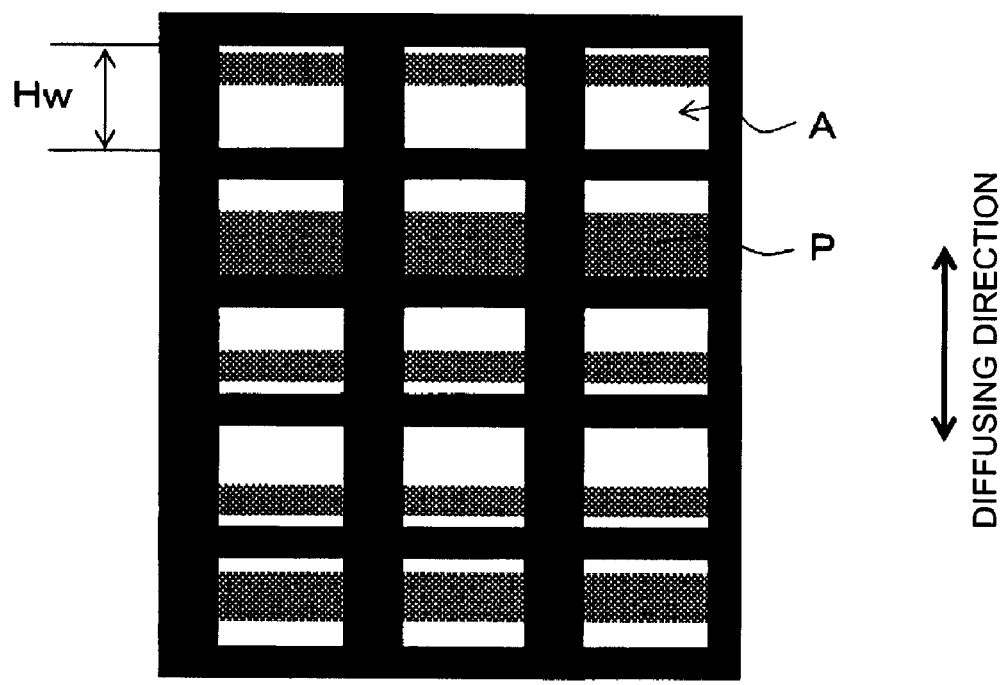
FIG. 18 is an explanatory diagram showing an enlarged view of the display region of the display element of the image display device.

FIG. 16 is a cross sectional view showing the schematic configuration of the image display device 11 in the present embodiment. The image display device 11 is the same as that of the second embodiment except that a reverse side reflecting mirror 25 is installed instead of the light-converging lens 22 of the second embodiment (FIG. 10).

The reverse side reflecting mirror 25 is an optical-path bending member for bending the optical path from the light source 21 to the display element 24, and is provided with a refracting surface 25a and reflecting surface 25b. The reflecting surface 25b is formed, for example, of a cylindrical mirror for converging the light from the light source 21 in the Y-axis direction. It can also be formed of another concave mirror (spherical mirror, aspherical mirror, or axi-asymmetric concave mirror). The refracting surface 25a has a curvature similar to that of the reflecting surface 25b.

In this configuration, the light from the light source 21 is refracted by the refracting surface 25a of the reverse side reflecting mirror 25 to reach the reflecting surface 25b, then, this light is reflected and is again refracted by the refracting surface 25a. Then the light is led to the diffusing means 23. The subsequent optical path is the same as that of the second embodiment.

The reverse side reflecting minor 25 converges the light from the light source 21 in the Y-axis direction, sets the light source 21 to be conjugate with the optical pupil E in the Y-axis direction, and does not have optical power in the X-axis direction. This procedure ensures easy mixing of colors by the diffusing means 23, and provides an image characterized by reduced color nonunifonmity, without increasing the color-to-color distance of the R, G, and B light-emitting sections of the light source 21 wherein separation occurs at pitches of 0.5 mm in the X-axis direction.

The reverse side reflecting mirror 25 converges the incident light by the optical power caused by reflection, and easily increases the optical power than the transparent lens. This allows the light from the light source 21 to be converged more in the Y-axis direction so that a bright image can be supplied. Further, the incident light is converged by the optical power caused by reflection, and therefore, chromatic aberration is reduced. The same conjugation between the light source 21 and optical pupil E can be used for different colors, so that effective use of color is ensured.

As described above, the hologram optical element 34 has greater wavelength selectivity in the Y-axis direction. In the meantime, the reverse side reflecting mirror 25 is provided with a refracting surface 25a in addition to the reflecting surface 25b. The light from the light source 21 is refracted by the refracting surface 25a and is reflected by the reflecting surface 25b. After that, this light is again refracted by the refracting surface 25a and is led to the diffusing means 23. This procedure allows the aberration to be reduced in such a way as to achieve approximate agreement between the peak wavelength of the light from the light source 21 and the diffraction peak wavelength of the hologram optical element 34. This reduces the reduction in the diffraction efficiency resulting from wavelength selectivity of the hologram optical element 34, and a bright image can be provided by an effective use of light.

Further, the light is bent by the reverse side reflecting mirror 25 to illuminate the display element 24. This structure makes an effective use of the illumination optical path (whereby the illumination system can be designed in a compact structure), and reduces the size of the casing 20, with the result that an image display device 11 designed in a compact and lightweight structure is implemented.

Since the illumination optical path is bent by the reverse side reflecting minor 25, the diffusing means 23 is placed close to the display element 24 in the present embodiment, although the layout of the diffusing means 23 undergoes some restrictions. The following describes the reason for this configuration.

The diffusing means 23 can be placed close to the light source 21. In this case, however, the optical path subsequent to diffusion of light by the diffusing means 23 is long, and this reduces the amount of light of the light source 21 passing through the display element 24. Further, to mix R, and B colors, the degree of diffusion of the diffusing means 23 must be increased. This results in poorer efficiency in the use of light, and a less bright image is supplied.

Further, the diffusing means 23 can be placed close to the reverse side reflecting mirror 25. However, the reverse side reflecting mirror 25 is installed in the form inclined with respect to the display element 24, and therefore, the efficiency of using the diffused light on the diffusing means 23 differs according to the position of the image in the Y-axis direction of the display element 24, with the result that luminance nonuniformity occurs in the Y-axis direction and the image quality is deteriorated.

For the aforementioned reason, the diffusing means 23 is placed close to the display element 24 in the present embodiment. To be more specific, the diffusing means 23 is installed on the optical path between the reverse side reflecting mirror 25 and display element 24. This arrangement allows the optical path to be bent by the reverse side reflecting mirror 25, whereby a compact and lightweight structure is formed. At the same time, the display element 24 is allowed to make effective use of the diffusing means 23, whereby the image to be observed is converted to a bright image free from color nonuniformity or luminance nonuniformity.

The reverse side reflecting mirror 25 can be provided with optical power negative in the X-axis direction. In this case, there is a reduction in the color-to-color distance of the R, and B light-emitting sections wherein separation occurs at pitches of 0.5 mm in the X-axis direction. This ensures easy color mixing of the diffusing means 23 and provides an image characterized by reduced color nonuniformity.

The image display device preferably applicable to an HMD has been described with reference to the embodiments. It should be noted that the image display device of each of the embodiments is applicable to other devices such as a Head Up Display (HUD) as well.

It goes without saying that an image display device, HMD, and HUD can be implemented by appropriate combination of the structures of the aforementioned embodiments.

INDUSTRIAL APPLICABILITY

The image display device of the present invention is applicable to the HMD and HUD, for example.

REFERENCE SIGNS LIST

1. Image display device
2. Light source
3. Diffusing means
3a. Diffusing surface
3b. Non-diffusing surface
4. Display element
5. Lens (ocular optical system)
11. Image display device
12. Supporting means
21. Light source
21R, $21R_1$, $21R_2$ Light-emitting sections (light-emitting diode)
21G, $21G_1$, $21G_2$ Light-emitting sections (light-emitting diode)
21B, $21B_1$, $21B_2$ Light-emitting sections (light-emitting diode)
22. Light-converging lens (Light-converging means)
23. Diffusing means
23a. Diffusing surface
24. Display element
25. Reverse side reflecting mirror (optical-path bending member)
25a Refracting surface
25b Reflecting surface
31 Ocular optical system
32 Ocular prism (first transparent substrate)
33 Deflecting prism (second transparent substrate)
34 Hologram optical element
A Pixel
BM Light-shielding section
E Optical pupil

The invention claimed is:

1. An image display device comprising:
   a point light source;
   a diffusing member comprising a diffusing surface in which recesses and protrusions are formed in one direction with a plurality of pitches, for diffusing light traveling from the light source by the diffusing surface in the one direction and emitting the diffused light;
   a display element comprising a plurality of pixels and a light-shielding section formed around the plurality of pixels, for displaying an image by modulating light traveling from the diffusing member with the plurality of pixels; and
   an ocular optical system for guiding light of an image traveling from the display element to an optical pupil, to make an observer observe a virtual image of the image at the optical pupil,
   wherein the image display device satisfies the following conditional expression (1), where Hw is an aperture width of the pixels of the display element in a diffusing direction of the diffusing member, Kw is a maximum pitch of the recesses and protrusions in the diffusing direction of the diffusing member, f is a focal length of the ocular optical system, and δ is a distance from a display surface of the display element to the diffusing surface of the diffusing member:

$$Hw/f \leq \tan 1' \leq Kw/(f+\delta) \tag{1}$$

2. The image display device of claim 1, wherein an aperture ratio Hw/Hp of the pixels of the display element in the diffusing direction of the diffusing member satisfies the following conditional expression (1A), where Hp is a pitch of the pixels of the display element in the diffusing direction of the diffusing member:

$$0.3 \leq Hw/Hp \leq 0.8 \tag{1A}$$

3. The image display device of claim 1,
wherein the diffusing member comprises a diffusing surface in which recesses and protrusions are formed in one direction with a plurality of pitches ranging from 1 μm to 20 μm.

4. The image display device of claim 1,
wherein the light source comprises light-emitting diodes emitting light of three colors of red, green, and blue, respectively, and
the light-emitting diodes are arrayed in the diffusing direction of the diffusing member.

5. The image display device of claim 4,
wherein the light source comprises two sets of light-emitting diodes for emitting red, green, and blue light, respectively, and
the light-emitting diodes of each color are arranged symmetrically with respect to an optical axis of the ocular optical system, where the optical axis is an axis optically connecting a center of a display region of the display element and a center of the optical pupil.

6. The image display device of claim 1,
wherein the distance δ from the display surface of the display element to the diffusing surface of the diffusing member is set such that a difference in visibility between a virtual image formed by the ocular optical system of the diffusing member and a virtual image of an image displayed on the display element is 10 diopters or less.

7. The image display device of claim 1,
wherein the diffusing member is arranged such that the diffusing direction intersects with a long-side direction of a rectangular display region of the display element.

8. The image display device of claim 1,
wherein a diffusion degree of the diffusing member in the diffusing direction is ten or more times larger than a diffusion degree of the diffusing member in a direction perpendicular to the diffusing direction.

9. The image display device of claim 1,
wherein an opposing surface to the diffusing surface in the diffusing member is a non-diffusing surface, and
the diffusing member is arranged such that the diffusing surface faces the display element.

10. The image display device of claim 1,
a light-converging member for converging light traveling from the light source, in a direction perpendicular to the diffusing direction of the diffusing member and for guiding the light to the diffusing member,
wherein the light source and the optical pupil are arranged at conjugate positions with respect to a direction perpendicular to the diffusing direction of the diffusing member.

11. The image display device of claim 10,
wherein the light-converging member has no-optical-power or negative-optical-power in a direction parallel with the diffusing direction of the diffusing member.

12. The image display device of claim 1, satisfying the following conditional expression (2), where Vw is an aperture width of the pixels of the display element in a direction perpendicular to the diffusing direction of the diffusing member:

$$\tan 1' \leq Vw/f \qquad (2).$$

13. The image display device of claim 1, further comprising an optical-path bending member for bending an optical path from the light source to the display element,
wherein the diffusing member is arranged in an optical path between the optical-path bending member and the display element.

14. The image display device of claim 13,
wherein the optical-path difference bending member comprises a refracting surface and a reflecting surface, and
after the refracting surface refracts light traveling from the light source and the reflecting surface reflects the light, the refracting surface refracts the light again to guide the light to the diffusing member.

15. The image display device of claim 1,
wherein the ocular optical system comprises a hologram optical element of a volume phase type and a reflection type, and
the hologram optical element diffracts and reflects light of an image traveling from the display element to guide the light to the optical pupil.

16. The image display device of claim 15,
wherein the hologram optical element has axi-asymmetric positive optical power.

17. The image display device of claim 16,
wherein the diffusing direction of the diffusing member is almost parallel with a direction perpendicular to an optical-axis incident surface of the hologram optical element, where the optical axis is an axis optically connecting a center of a display region of the display element to a center of the optical pupil.

18. The image display device of claim 15,
wherein the light source comprises a light-emitting diode, and
a wavelength at which a diffraction efficiency of the hologram optical element is maximum and a wavelength at which an intensity of light emitted from the light source are almost the same.

19. The image display device of claim 1,
wherein the ocular optical system comprises a first transparent substrate for totally reflecting light of an image from the display element on a inside thereof, to guide the light to the optical pupil, and for transmitting outside light to guide the outside light to the optical pupil.

20. The image display device of claim 19,
wherein the ocular optical system further comprises a second transparent substrate for canceling refraction of the outside light caused in the first transparent substrate.

21. A head-mounting display comprising:
the image display device of claim 1; and
a supporting member for supporting the image display device in front of an eye of an observer.

* * * * *